(12) United States Patent
Fujita et al.

(10) Patent No.: US 11,926,771 B2
(45) Date of Patent: Mar. 12, 2024

(54) DOUBLE-SIDED PRESSURE-SENSITIVE ADHESIVE TAPE

(71) Applicant: NITTO DENKO CORPORATION, Ibaraki (JP)

(72) Inventors: Takuya Fujita, Ibaraki (JP); Hiromichi Sumida, Ibaraki (JP); Masahito Niwa, Ibaraki (JP); Masataka Nishiwaki, Ibaraki (JP); Yasushi Buzojima, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 446 days.

(21) Appl. No.: 17/070,257

(22) Filed: Oct. 14, 2020

(65) Prior Publication Data

US 2021/0189190 A1 Jun. 24, 2021

(30) Foreign Application Priority Data

Dec. 20, 2019 (JP) ................................ 2019-230737

(51) Int. Cl.
*C09J 7/25* (2018.01)
*C09J 7/38* (2018.01)

(52) U.S. Cl.
CPC ................. *C09J 7/385* (2018.01); *C09J 7/25* (2018.01); *C09J 2301/124* (2020.08); *C09J 2433/00* (2013.01); *C09J 2475/006* (2013.01)

(58) Field of Classification Search
CPC ....................................................... C09J 7/25
See application file for complete search history.

(56) References Cited

U.S. PATENT DOCUMENTS 4,773,201 A * 9/1988 Trezza ................ E04F 13/0862
D25/138
2005/0263243 A1* 12/2005 Schumann ................ C09J 7/29
156/247

(Continued)

FOREIGN PATENT DOCUMENTS

JP 2010-194699 A 9/2010
JP 2013-75999 A 4/2013

(Continued)

OTHER PUBLICATIONS

Notice of Reasons for Refusal dated Jun. 27, 2023 in Japanese Application No. 2019-230737.

(Continued)

*Primary Examiner* — William P Watkins, III
(74) *Attorney, Agent, or Firm* — Sughrue Mion, PLLC

(57) ABSTRACT

A double-sided pressure-sensitive adhesive tape having excellent impact resistance, excellent reworkability, and excellent alcohol resistance. The double-sided pressure-sensitive adhesive tape includes: a base material layer; and pressure-sensitive adhesive layers arranged on both surface sides of the base material layer, wherein the pressure-sensitive adhesive layers are each formed from a pressure-sensitive adhesive composition, wherein the pressure-sensitive adhesive composition contains at least one kind selected from the group consisting of a monomer component (m) and a polymer component (P) obtained by polymerizing the monomer component (m), wherein the monomer component (m) contains 50 wt % or more of butyl (meth)acrylate, wherein a ratio of a thickness of the base material layer to a total thickness of the double-sided pressure-sensitive adhesive tape is less than 35%, and wherein the double-sided pressure-sensitive adhesive tape has a force, which is gen- (Continued)

erated at 100% strain at 23° C. and 50% RH, of from 30 N/m to 150 N/m.

5 Claims, 1 Drawing Sheet

(56) References Cited

U.S. PATENT DOCUMENTS

| | | | |
|---|---|---|---|
| 2013/0017389 A1* | 1/2013 | Tamura | C09J 7/38 428/314.4 |
| 2013/0209798 A1 | 8/2013 | Satou et al. | |
| 2017/0158918 A1 | 6/2017 | Jozuka et al. | |

FOREIGN PATENT DOCUMENTS

| | | |
|---|---|---|
| JP | 2013-163781 A | 8/2013 |
| JP | 2015-120876 A | 7/2015 |
| WO | 2017047269 A1 | 3/2017 |
| WO | 2019/239956 A1 | 12/2019 |

OTHER PUBLICATIONS

First Office Action dated Jan. 27, 2024 by the State Intellectual Property Office of People's Republic of China in CN Appln 2020115083820 dated Jan. 27, 2024.

* cited by examiner

DOUBLE-SIDED PRESSURE-SENSITIVE ADHESIVE TAPE

This application claims priority under 35 U.S.C. Section 119 to Japanese Patent Application No. 2019-230737 filed on Dec. 20, 2019, which is herein incorporated by references.

BACKGROUND OF THE INVENTION

1. Field of the Invention

The present invention relates to a double-sided pressure-sensitive adhesive tape.

2. Description of the Related Art

In recent years, along with a trend of the sophistication of various kinds of performance of a mobile device, the sophistication of various kinds of performance of various constituent members adopted in the mobile device has been required. In the mobile device, a double-sided pressure-sensitive adhesive tape is sometimes adopted for the bonding of a casing or the like. The sophistication of various kinds of performance of the double-sided pressure-sensitive adhesive tape has also been required in recent years.

There is a risk in that the mobile device falls depending on its use form. Accordingly, a mobile device having high impact resistance has been required. An impact-absorbing member is sometimes arranged outside the casing of the mobile device for improving the impact resistance of the mobile device. However, in such form, the size of the mobile device may increase or its design property may be impaired.

In view of the foregoing, it is desired that excellent impact resistance be imparted to the double-sided pressure-sensitive adhesive tape that may be arranged in the mobile device.

A double-sided pressure-sensitive adhesive sheet having impact resistance has recently been reported (Japanese Patent Application Laid-open No. 2015-120876). The double-sided pressure-sensitive adhesive sheet includes a base material made of a foam as an essential component for expressing the impact resistance. However, when the foam is extended to a certain extent or more, or a force is applied thereto, the foam is torn to have a smaller area or to become thinner. As a result, there is a problem in that the cell portions of the foam occupy a large part of an adhesion portion between the sheet and an adherend to reduce an adhesive property therebetween.

Further, the double-sided pressure-sensitive adhesive sheet to be used for the mobile device is often bonded to an expensive member, and hence is required to have satisfactory reworkability in rebonding or the like. However, the related-art double-sided pressure-sensitive adhesive sheet may cause a problem of, for example, being torn during reworking, and the double-sided pressure-sensitive adhesive sheet to be used for the mobile device has been required to have excellent reworkability.

In addition, the mobile device is often exposed to an everyday living environment, and is often brought into contact with an alcohol-based solution, such as a cleaning solution or a disinfectant solution.

Therefore, the pressure-sensitive adhesive sheet to be used for the mobile device is required to have all of high adhesive strength for various adherends that may be used for the mobile device, high impact resistance, and high alcohol resistance. However, the related-art pressure-sensitive adhesive sheet alone cannot achieve all of those properties, and hence there is a demand for a technology that enables expression of all of high adhesive strength for various adherends that may be used for the mobile device, high impact resistance, and high alcohol resistance.

SUMMARY OF THE INVENTION

An object of the present invention is to provide a double-sided pressure-sensitive adhesive tape that can express all of excellent impact resistance, excellent reworkability, and excellent alcohol resistance.

According to at least one embodiment of the present invention, there is provided a double-sided pressure-sensitive adhesive tape, including: a base material layer; and pressure-sensitive adhesive layers arranged on both surface sides of the base material layer, wherein the pressure-sensitive adhesive layers are each formed from a pressure-sensitive adhesive composition, wherein the pressure-sensitive adhesive composition contains at least one kind selected from the group consisting of a monomer component (m) and a polymer component (P) obtained by polymerizing the monomer component (m), wherein the monomer component (m) contains 50 wt % or more of butyl (meth)acrylate, wherein a ratio of a thickness of the base material layer to a total thickness of the double-sided pressure-sensitive adhesive tape is less than 35%, and wherein the double-sided pressure-sensitive adhesive tape has a force, which is generated at 100% strain at 23° C. and 50% RH, of from 30 N/m to 150 N/m.

In at least one embodiment of the present invention, the base material layer is formed of a resin film.

In at least one embodiment of the present invention, the resin film contains a polyurethane-based resin as a main component.

In at least one embodiment of the present invention, the monomer component (m) contains 90 wt % to 99 wt % of the butyl (meth)acrylate.

In at least one embodiment of the present invention, the monomer component (m) contains 1 wt % to 10 wt % of (meth)acrylic acid.

In at least one embodiment of the present invention, the double-sided pressure-sensitive adhesive tape has a total thickness of 100 μm or more.

In at least one embodiment of the present invention, the double-sided pressure-sensitive adhesive tape is used for fixing an electronic device member.

DESCRIPTION OF THE EMBODIMENTS

Figure 1:
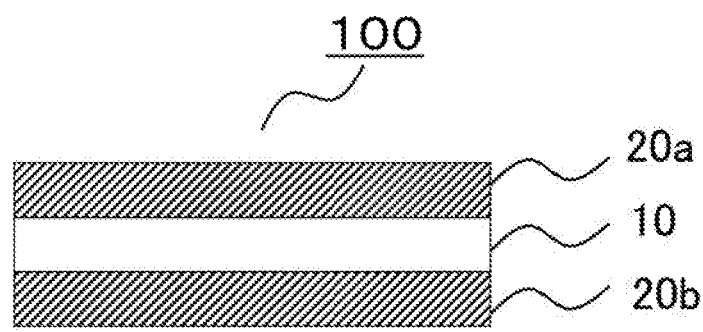
FIG. 1 is a schematic sectional view of a double-sided pressure-sensitive adhesive tape according to at least one embodiment of the present invention.

As used herein, the term "(meth)acryl" means at least one kind selected from the group consisting of an acryl and a methacryl, and the term "(meth)acrylate" means at least one kind selected from the group consisting of an acrylate and a methacrylate.

<<A. Double-Sided Pressure-Sensitive Adhesive Tape>>

A double-sided pressure-sensitive adhesive tape according to at least one embodiment of the present invention includes a base material layer and pressure-sensitive adhesive layers arranged on both surface sides thereof. The double-sided pressure-sensitive adhesive tape according to at least one embodiment of the present invention may include any appropriate other layer to such an extent that the effect of the present invention is not impaired as long as the pressure-sensitive adhesive layers are arranged on both surface sides of the base material layer.

FIG. 1 is a schematic sectional view of a double-sided pressure-sensitive adhesive tape according to at least one embodiment of the present invention. In FIG. 1, a double-sided pressure-sensitive adhesive tape 100 includes a base material layer 10, and a pressure-sensitive adhesive layer 20a and a pressure-sensitive adhesive layer 20b on both sides thereof.

Each of the pressure-sensitive adhesive layers may be a single layer, or may include two or more layers.

The base material layer may be a single layer, or may include two or more layers.

The total thickness of the double-sided pressure-sensitive adhesive tape according to at least one embodiment of the present invention is preferably 100 μm or more because the effect of the present invention can be further expressed, and the total thickness is more preferably from 100 μm to 1,000 μm, still more preferably from 100 μm to 500 μm, particularly preferably from 150 μm to 400 μm.

Any appropriate release liner may be arranged on the surface of the pressure-sensitive adhesive layer for, for example, protecting the tape until the tape is used to such an extent that the effect of the present invention is not impaired. Examples of the release liner include: a release liner obtained by subjecting the surface of a base material (liner base material), such as paper or a plastic film, to a silicone treatment; and a release liner obtained by laminating a polyolefin-based resin on the surface of a base material (liner base material), such as paper or a plastic film. Examples of the plastic film serving as the liner base material include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film. The plastic film serving as the liner base material is preferably a polyethylene film.

The thickness of the release liner is preferably from 1 μm to 500 μm, more preferably from 3 μm to 450 μm, still more preferably from 5 μm to 400 μm, particularly preferably from 10 μm to 300 μm.

The double-sided pressure-sensitive adhesive tape according to at least one embodiment of the present invention has a force, which is generated at 100% strain at 23° C. and 50% RH, of from 30 N/m to 150 N/m, preferably from 30 N/m to 130 N/m, more preferably from 30 N/m to 90 N/m, still more preferably from 30 N/m to 80 N/m, particularly preferably from 32 N/m to 50 N/m. When the force generated at 100% strain is so low as to fall outside the ranges, there is a risk in that a problem of a reduction in reworkability, such as the double-sided pressure-sensitive adhesive tape being torn during reworking, may occur. When the force generated at 100% strain is so high as to fall outside the ranges, there is a risk in that the impact resistance of the double-sided pressure-sensitive adhesive tape may be impaired.

The ratio of the thickness of the base material layer to the total thickness of the double-sided pressure-sensitive adhesive tape according to at least one embodiment of the present invention is less than 35%, preferably from 3% to 25%, more preferably from 3% to 20%, still more preferably from 3% to 15%, particularly preferably from 5% to 10%. When the ratio of the thickness of the base material layer to the total thickness of the double-sided pressure-sensitive adhesive tape according to at least one embodiment of the present invention falls within the ranges, the effect of the present invention can be sufficiently expressed.

The double-sided pressure-sensitive adhesive tape according to at least one embodiment of the present invention has an impact resistance at 23° C. and 50% RH of preferably 0.30 J or more, more preferably 0.34 J or more, still more preferably 0.39 J or more, still more preferably 0.44 J or more, particularly preferably 0.51 J or more, most preferably 0.59 J or more. When the impact resistance is so low as to fall outside the ranges, there is a risk in that a laminate that can express high impact resistance cannot be provided.

The pressure-sensitive adhesive strength of the double-sided pressure-sensitive adhesive tape according to at least one embodiment of the present invention is preferably from 5 N/10 mm to 50 N/10 mm, more preferably from 6 N/10 mm to 40 N/10 mm, still more preferably from 7 N/10 mm to 30 N/10 mm, particularly preferably from 8 N/10 mm to 20 N/10 mm. When the pressure-sensitive adhesive strength of the double-sided pressure-sensitive adhesive tape according to at least one embodiment of the present invention falls within the ranges, a function as a double-sided pressure-sensitive adhesive tape can be sufficiently expressed.

<A-1. Pressure-Sensitive Adhesive Layers>

Each of the pressure-sensitive adhesive layers may be a single layer, or may include two or more layers. In the case of two or more layers, all of the pressure-sensitive adhesive layers may have the same composition, or at least one of the pressure-sensitive adhesive layers may be different from the other(s) in composition.

Each of the pressure-sensitive adhesive layers is formed from a pressure-sensitive adhesive composition.

Each of the pressure-sensitive adhesive layers is formed from the pressure-sensitive adhesive composition by any appropriate method. Examples of such method include: a method (direct method) involving applying the pressure-sensitive adhesive composition serving as a formation material for the pressure-sensitive adhesive layers onto any appropriate base material (e.g., a base material film), and drying the composition as required, to form the pressure-sensitive adhesive layers on the base material; and a method (transfer method) involving applying the pressure-sensitive adhesive composition to a surface having releasability (release surface), and drying the composition as required, to form the pressure-sensitive adhesive layers on the surface having releasability (release surface), and transferring the pressure-sensitive adhesive layers onto any appropriate base material (e.g., a base material film). The surface having releasability (release surface) is, for example, the surface of the release liner described in the foregoing.

Any appropriate application method may be adopted as a method of applying the pressure-sensitive adhesive composition to such an extent that the effect of the present invention is not impaired. Examples of such application method include roll coating, gravure coating, reverse coating, roll brushing, spray coating, an air knife coating method, and extrusion coating with a die coater or the like. Active energy ray irradiation, such as UV irradiation, may be performed for curing an applied layer formed by the application.

The drying of the pressure-sensitive adhesive composition may be performed under heating from the viewpoints of, for example, the acceleration of the cross-linking reaction of the composition and an improvement in production efficiency of the tape. A drying temperature may be typically set to, for example, from 40° C. to 150° C., and is preferably from 60° C. to 130° C. After the drying of the pressure-sensitive adhesive composition, aging may be further performed for the purposes of, for example, adjusting the migration of a component in the pressure-sensitive adhesive layer, advancing the cross-linking reaction, and alleviating strain that may be present in the pressure-sensitive adhesive layer.

The thickness of each of the pressure-sensitive adhesive layers is preferably from 10 μm to 1,000 μm because the effect of the present invention can be further expressed, and the thickness is more preferably from 20 μm to 700 μm, still more preferably from 30 μm to 500 μm, particularly preferably from 40 μm to 300 μm, most preferably from 50 μm to 200 μm.

<A-1-1. Pressure-Sensitive Adhesive Composition>

The pressure-sensitive adhesive composition contains at least one kind selected from the group consisting of a monomer component (m) and a polymer component (P) obtained by the polymerization of the monomer component (m). That is, typically, the pressure-sensitive adhesive composition may have any one of the following forms: a form that contains the polymer component (P) and is substantially free of the monomer component (m) (form 1); a form that contains the monomer component (m) and is substantially free of the polymer component (P) (form 2); and a form that contains both of the monomer component (m) and the polymer component (P) (form 3).

The form that contains the polymer component (P) and is substantially free of the monomer component (m) (form 1) is a form in which, at the stage of the preparation of the pressure-sensitive adhesive composition, the polymer component (P) is substantially formed by the polymerization of the monomer component (m).

The form that contains the monomer component (m) and is substantially free of the polymer component (P) (form 2) is a form in which, at the stage of the preparation of the pressure-sensitive adhesive composition, substantially no polymerization of the monomer component (m) occurs, and hence the polymer component (P) has not been formed yet. In the form, the polymer component (P) may be formed by, for example, curing the applied layer formed by the application of the prepared pressure-sensitive adhesive composition through active energy ray irradiation, such as UV irradiation.

The form that contains both of the monomer component (m) and the polymer component (P) (form 3) is a form in which, at the stage of the preparation of the pressure-sensitive adhesive composition, part of the molecules of the monomer component (m) are polymerized to form a partial polymer, and the molecules of the monomer component (m) that are unreacted remain. In the form, the polymer component (P) may be formed by, for example, curing the applied layer formed by the application of the prepared pressure-sensitive adhesive composition through active energy ray irradiation, such as UV irradiation.

In the case of the form 1 (form that contains the polymer component (P) and is substantially free of the monomer component (m)), the content of the polymer component (P) in the pressure-sensitive adhesive composition is as follows: when the total amount of the pressure-sensitive adhesive composition is set to 100 parts by weight, the content of the polymer component (P) is preferably from 50 wt % to 100 wt %, more preferably from 60 wt % to 100 wt %, still more preferably from 70 wt % to 100 wt %, particularly preferably from 80 wt % to 100 wt %.

In the case of the form 2 (form that contains the monomer component (m) and is substantially free of the polymer component (P)), the content of the monomer component (m) in the pressure-sensitive adhesive composition is as follows: when the total amount of the pressure-sensitive adhesive composition is set to 100 parts by weight, the content of the monomer component (m) is preferably from 50 wt % to 100 wt %, more preferably from 60 wt % to 100 wt %, still more preferably from 70 wt % to 100 wt %, particularly preferably from 80 wt % to 100 wt %.

In the case of the form 3 (form that contains both of the monomer component (m) and the polymer component (P)), the total content of the polymer component (P) and the monomer component (m) in the pressure-sensitive adhesive composition is as follows: when the total amount of the pressure-sensitive adhesive composition is set to 100 parts by weight, the total content of the polymer component (P) and the monomer component (m) is preferably from 50 wt % to 100 wt %, more preferably from 60 wt % to 100 wt %, still more preferably from 70 wt % to 100 wt %, particularly preferably from 80 wt % to 100 wt %.

The pressure-sensitive adhesive composition may contain any appropriate colorant from the viewpoint of, for example, adjusting its light transmissivity (light-shielding property) to such an extent that the effect of the present invention is not impaired. A conventionally known pigment or dye may be used as such colorant. Examples of the pigment include: inorganic pigments, such as carbon black, zinc carbonate, zinc oxide, zinc sulfide, talc, kaolin, calcium carbonate, titanium oxide, silica, lithium fluoride, calcium fluoride, barium sulfate, alumina, zirconia, an iron oxide-based pigment, an iron hydroxide-based pigment, a chromium oxide-based pigment, a spinel-type calcined pigment, a chromic acid-based pigment, a chrome vermilion-based pigment, an iron blue-based pigment, an aluminum powder-based pigment, a bronze powder-based pigment, a silver powder-based pigment, and calcium phosphate; and organic pigments, such as a phthalocyanine-based pigment, an azo-based pigment, a condensed azo-based pigment, an azo lake-based pigment, an anthraquinone-based pigment, a perylene-perinone-based pigment, an indigo-based pigment, a thioindigo-based pigment, an isoindolinone-based pigment, an azomethine-based pigment, a dioxazine-based pigment, a quinacridone-based pigment, an aniline black-based pigment, and a triphenylmethane-based pigment. Examples of the dye include an azo-based dye, anthraquinone, quinophthalone, a styryl-based dye, diphenylmethane, triphenylmethane, oxazine, triazine, xanthan, azomethine, acridine, and diazine. The colorants may be used alone or in combination thereof.

A black colorant is specifically, for example, carbon black, graphite, copper oxide, manganese dioxide, aniline black, perylene black, titanium black, cyanine black, activated carbon, ferrite (e.g., non-magnetic ferrite or magnetic ferrite), magnetite, chromium oxide, iron oxide, molybdenum disulfide, a chromium complex, or an anthraquinone-based colorant.

The content of the colorant in the pressure-sensitive adhesive composition is preferably less than 30 wt %, more preferably less than 20 wt %, still more preferably less than 13 wt %, particularly preferably less than 10 wt %, most preferably less than 8 wt %.

The pressure-sensitive adhesive composition may contain any appropriate other component to such an extent that the effect of the present invention is not impaired. Examples of such other component include a resin component except the polymer component (P), a tackifier, a cross-linking agent, an inorganic filler, an organic filler, a metal powder, a pigment, a foil-like substance, a softener, an age resistor, a conductive agent, a rust inhibitor, a UV absorber, an antioxidant, a light stabilizer, a surface lubricant, a leveling agent, a corrosion inhibitor, a heat stabilizer, a polymerization inhibitor, a lubricant, a solvent, and a catalyst.

<A-1-1-1. Monomer Component (m)>

The monomer component (m) contains 50 wt % or more of butyl (meth)acrylate. The content of butyl (meth)acrylate in the total amount of the monomer component (m) is preferably from 50 wt % to 100 wt %, more preferably from 70 wt % to 99.5 wt %, still more preferably from 90 wt % to 99 wt %, particularly preferably from 91 wt % to 98 wt %, most preferably from 92 wt % to 97 wt %. When the content of butyl (meth)acrylate in the monomer component (m) is adjusted within the ranges, a double-sided pressure-sensitive adhesive tape that can express all of excellent impact resistance, excellent reworkability, and excellent alcohol resistance can be provided.

Butyl (meth)acrylate is preferably butyl acrylate, more preferably n-butyl acrylate because the effect of the present invention can be further expressed.

The monomer component (m) preferably contains (meth)acrylic acid, and more preferably contains acrylic acid. The content of (meth)acrylic acid in the total amount of the monomer component (m) is preferably from 1 wt % to 10 wt %, more preferably from 1 wt % to 8 wt %, still more preferably from 2 wt % to 7 wt %, particularly preferably from 2 wt % to 6 wt %, most preferably from 2.5 wt % to 5.5 wt %. When the content of (meth)acrylic acid in the monomer component (m) is adjusted within the ranges, a double-sided pressure-sensitive adhesive tape that can express all of more excellent impact resistance, more excellent reworkability, and more excellent alcohol resistance can be provided.

The monomer component (m) may contain any other monomer. Such other monomers may be used alone or in combination thereof.

The content of the other monomer in the total amount of the monomer component (m) is preferably from 0 wt % to 10 wt %, more preferably from 0 wt % to 8 wt %, still more preferably from 0 wt % to 6 wt %, particularly preferably from 0 wt % to 4 wt %, most preferably from 0 wt % to 2 wt %. When the content of the other monomer in the monomer component (m) is adjusted within the ranges, a double-sided pressure-sensitive adhesive tape that can express all of more excellent impact resistance, more excellent reworkability, and more excellent alcohol resistance can be provided.

Examples of the other monomer include an alicyclic structure-containing acrylic monomer, an alkyl (meth)acrylate except butyl (meth)acrylate, a hydroxy group-containing monomer, a carboxyl group-containing monomer except (meth)acrylic acid, a nitrogen-based cyclic structure-containing monomer, a cyclic ether group-containing monomer, a glycol-based acrylic ester monomer, a styrene-based monomer, an amide group-containing monomer, an amino group-containing monomer, an imide group-containing monomer, a vinyl ether monomer, a silane-based monomer, and a polyfunctional monomer.

The alicyclic structure-containing acrylic monomer is preferably an acrylic monomer having a cyclic aliphatic hydrocarbon structure. The number of carbon atoms of the cyclic aliphatic hydrocarbon structure is preferably 3 or more, more preferably from 6 to 24, still more preferably from 6 to 18, particularly preferably from 6 to 12. Specific examples of such alicyclic structure-containing acrylic monomer include cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, isobornyl (meth)acrylate, and dicyclopentanyl (meth)acrylate.

Herein, the alkyl (meth)acrylate except butyl (meth)acrylate does not include an alkyl (meth)acrylate having an alicyclic structure. Specific examples of the alkyl (meth)acrylate except butyl (meth)acrylate include: alkyl (meth)acrylates each having a linear alkyl group (except a n-butyl group) at an ester terminal thereof, such as methyl (meth)acrylate, ethyl (meth)acrylate, n-propyl (meth)acrylate, n-pentyl (meth)acrylate, n-hexyl (meth)acrylate, n-heptyl (meth)acrylate, n-octyl (meth)acrylate, n-nonyl (meth)acrylate, n-decyl (meth)acrylate, n-undecyl (meth)acrylate, n-dodecyl (meth)acrylate, n-tridecyl (meth)acrylate, n-tetradecyl (meth)acrylate, n-pentadecyl (meth)acrylate, n-hexadecyl (meth)acrylate, n-heptadecyl (meth)acrylate, and n-octadecyl (meth)acrylate; and alkyl (meth)acrylates each having a branched alkyl group having 4 to 18 carbon atoms (except an isobutyl group) at an ester terminal thereof, such as isopropyl (meth)acrylate, t-butyl (meth)acrylate, isopentyl (meth)acrylate, t-pentyl (meth)acrylate, neopentyl (meth)acrylate, isohexyl (meth)acrylate, isoheptyl (meth)acrylate, 2-ethylhexyl (meth)acrylate, isooctyl (meth)acrylate, isononyl (meth)acrylate, isodecyl (meth)acrylate, 2-propylheptyl (meth)acrylate, isoundecyl (meth)acrylate, isododecyl (meth)acrylate, isotridecyl (meth)acrylate, isomyristyl (meth)acrylate, isopentadecyl (meth)acrylate, isohexadecyl (meth)acrylate, isoheptadecyl (meth)acrylate, and isostearyl (meth)acrylate.

Specific examples of the hydroxy group-containing monomer include: hydroxyalkyl (meth)acrylates, such as 2-hydroxybutyl (meth)acrylate, 2-hydroxyethyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, and 12-hydroxylauryl (meth)acrylate; hydroxyalkylcycloalkane (meth)acrylates, such as (4-hydroxymethylcyclohexyl) methyl (meth)acrylate; and other hydroxy group-containing monomers, such as hydroxyethyl (meth)acrylamide, allyl alcohol, 2-hydroxyethyl vinyl ether, 4-hydroxybutyl vinyl ether, and diethylene glycol monovinyl ether. Of those hydroxy group-containing monomers, a hydroxyalkyl (meth)acrylate is preferred because more excellent impact resistance can be expressed, and a hydroxyalkyl (meth)acrylate having a hydroxyalkyl group having 2 to 6 carbon atoms is more preferred, and 2-hydroxyethyl (meth)acrylate or 4-hydroxybutyl (meth)acrylate is still more preferred.

Specific examples of the carboxyl group-containing monomer except (meth)acrylic acid include carboxyethyl (meth)acrylate, carboxypentyl (meth)acrylate, itaconic acid, maleic acid, fumaric acid, crotonic acid, and isocrotonic acid.

Specific examples of the nitrogen-based cyclic structure-containing monomer include: lactam-based vinyl monomers, such as N-vinylpyrrolidone, N-vinyl-ε-caprolactam, and methyl vinylpyrrolidone; vinyl-based monomers each having a nitrogen-containing heterocycle, such as vinylpyridine, vinylpiperidone, vinylpyrimidine, vinylpiperazine, vinylpyrazine, vinylpyrrole, vinylimidazole, vinyloxazole, and vinylmorpholine; and (meth)acrylic monomers each containing a heterocycle, such as a morpholine ring, a piperidine ring, a pyrrolidine ring, or a piperazine ring (e.g., N-acryloylmorpholine, N-acryloylpiperidine, N-methacryloylpiperidine, and N-acryloylpyrrolidine).

Specific examples of the cyclic ether group-containing monomer include: epoxy group-containing monomers, such as glycidyl (meth)acrylate, 3,4-epoxycyclohexylmethyl (meth)acrylate, 4-hydroxybutyl (meth)acrylate glycidyl ether, methylglycidyl (meth)acrylate, and allyl glycidyl ether; and oxetane group-containing monomers, such as 3-oxetanylmethyl (meth)acrylate, 3-methyl-oxetanylmethyl (meth)acrylate, 3-ethyl-oxetanylmethyl (meth)acrylate, 3-butyl-oxetanylmethyl (meth)acrylate, and 3-hexyl-oxetanylmethyl (meth)acrylate.

Specific examples of the glycol-based acrylic ester monomer include polyethylene glycol (meth)acrylate, polypropylene glycol (meth)acrylate, methoxyethylene glycol (meth)acrylate, and methoxypolypropylene glycol (meth)acrylate.

Specific examples of the styrene-based monomer include styrene and α-methylstyrene.

Specific examples of the amide group-containing monomer include acrylamide, methacrylamide, diethylacrylamide, N-vinylpyrrolidone, N,N-dimethylacrylamide, N,N-dimethylmethacrylamide, N,N-diethylacrylamide, N,N-diethylmethacrylamide, N,N'-methylenebisacrylamide, N,N-dimethylaminopropylacrylamide, N,N-dimethylaminopropylmethacrylamide, diacetone acrylamide, and N,N-hydroxyethylacrylamide.

Specific examples of the amino group-containing monomer include aminoethyl (meth)acrylate, N,N-dimethylaminoethyl (meth)acrylate, and N,N-dimethylaminopropyl (meth)acrylate.

Specific examples of the imide group-containing monomer include cyclohexyl maleimide, isopropyl maleimide, N-cyclohexyl maleimide, and itaconimide.

Specific examples of the silane-based monomer include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

Specific examples of the polyfunctional monomer include: ester compounds of polyhydric alcohols and (meth)acrylic acid, such as (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol penta(meth)acrylate, dipentaerythritol hexa(meth)acrylate, 1,2-ethylene glycol di(meth)acrylate, 1,6-hexanediol di(meth)acrylate, 1,12-dodecanediol di(meth)acrylate, trimethylolpropane tri(meth)acrylate, and tetramethylolmethane tri(meth)acrylate; allyl (meth)acrylate; vinyl (meth)acrylate; divinylbenzene; epoxy acrylate; polyester acrylate; urethane acrylate; butyl di(meth)acrylate; and hexyl di(meth)acrylate.

<A-1-1-2. Polymer Component (P)>

The polymer component (P) is obtained by the polymerization of the monomer component (m). The polymer component (P) is typically an acrylic polymer. The polymer components (P) may be used alone or in combination thereof.

Any appropriate production method may be adopted as a method of producing the polymer component (P) to such an extent that the effect of the present invention is not impaired. Examples of such production method include various kinds of radical polymerization including: solution polymerization; active energy ray polymerization, such as UV polymerization; bulk polymerization; and emulsion polymerization. Any appropriate polymerization conditions may be adopted as polymerization conditions to such an extent that the effect of the present invention is not impaired.

Any appropriate polymerization structure may be adopted as the polymerization structure of the polymer component (P) to be obtained to such an extent that the effect of the present invention is not impaired. Examples of such polymerization structure include a random copolymer, a block copolymer, and a graft copolymer.

Any appropriate additive may be adopted as an additive to be used in the radical polymerization, such as a polymerization initiator, a chain transfer agent, or an emulsifying agent, to such an extent that the effect of the present invention is not impaired.

A polymerization solvent that may be used in the solution polymerization or the like is, for example, ethylacetate or toluene. The polymerization solvents may be used alone or in combination thereof.

The solution polymerization is performed in a stream of an inert gas, such as nitrogen, after the addition of a polymerization initiator typically under the reaction conditions of a temperature of from about 50° C. to about 70° C., and a time period of from about 5 hours to about 30 hours.

Any appropriate thermal polymerization initiator may be adopted as the polymerization initiator that may be used in the solution polymerization or the like to such an extent that the effect of the present invention is not impaired. The polymerization initiators may be used alone or in combination thereof. Examples of such polymerization initiator include: azo-based initiators, such as 2,2'-azobisisobutyronitrile, 2,2'-azobis-2-methylbutyronitrile, dimethyl 2,2'-azobis(2-methylpropionate), 4,4'-azobis-4-cyanovaleric acid, azobisisovaleronitrile, 2,2'-azobis(2-amidinopropane) dihydrochloride, 2,2'-azobis[2-(5-methyl-2-imidazolin-2-yl) propane]dihydrochloride, 2,2'-azobis(2-methylpropionamidine) disulfate, 2,2'-azobis(N,N'-dimethyleneisobutylamidine), and 2,2'-azobis[N-(2-carboxyethyl)-2-methylpropionamidine] hydrate (VA-057, manufactured by Wako Pure Chemical Industries, Ltd.); peroxide-based initiators including persulfates, such as potassium persulfate and ammonium persulfate, di(2-ethylhexyl) peroxydicarbonate, di(4-t-butylcyclohexyl) peroxydicarbonate, di-sec-butyl peroxydicarbonate, t-butyl peroxyneodecanoate, t-hexyl peroxypivalate, t-butyl peroxypivalate, dilauroyl peroxide, di-n-octanoyl peroxide, 1,1,3,3-tetramethylbutyl peroxy-2-ethylhexanoate, di(4-methylbenzoyl) peroxide, dibenzoyl peroxide, t-butyl peroxyisobutyrate, 1,1-di(t-hexylperoxy)cyclohexane, t-butyl hydroperoxide, and hydrogen peroxide; and redox-based initiators each obtained by combining a peroxide and a reducing agent, such as a combination of a persulfate and sodium hydrogen sulfite, and a combination of a peroxide and sodium ascorbate.

The usage amount of the polymerization initiator is preferably 1 part by weight or less, more preferably from 0.005 part by weight to 1 part by weight, still more preferably from 0.01 part by weight to 0.7 part by weight, particularly preferably from 0.02 part by weight to 0.5 part by weight with respect to 100 parts by weight of the total amount of the monomer component (m) because of, for example, the following reason: the polymerization reaction can be effectively advanced.

Any appropriate chain transfer agent may be adopted as the chain transfer agent to such an extent that the effect of the present invention is not impaired. The chain transfer agents may be used alone or in combination thereof. Examples of such chain transfer agent include laurylmercaptan, glycidyl mercaptan, mercaptoacetic acid, 2-mercaptoethanol, thioglycolic acid, 2-ethylhexyl thioglycolate, and 2,3-dimercapto-1-propanol.

The usage amount of the chain transfer agent is preferably 0.1 part by weight or less with respect to 100 parts by weight of the total amount of the monomer component (m) because of, for example, the following reason: the polymerization reaction can be effectively advanced.

Any appropriate emulsifying agent may be adopted as the emulsifying agent to such an extent that the effect of the present invention is not impaired. The emulsifying agents may be used alone or in combination thereof. Examples of such emulsifying agent include: anionic emulsifying agents, such as sodium lauryl sulfate, ammonium lauryl sulfate, sodium dodecylbenzenesulfonate, an ammonium polyoxyethylene alkyl ether sulfate, and a sodium polyoxyethylene alkyl phenyl ether sulfate; and nonionic emulsifying agents, such as a polyoxyethylene alkyl ether, a polyoxyethylene alkyl phenyl ether, a polyoxyethylene fatty acid ester, and a polyoxyethylene-polyoxypropylene block polymer.

The usage amount of the emulsifying agent is preferably 5 parts by weight or less, more preferably from 0.3 part by weight to 5 parts by weight, still more preferably from 0.4 part by weight to 3 parts by weight, particularly preferably from 0.5 part by weight to 1 part by weight with respect to 100 parts by weight of the total amount of the monomer component (m) from the viewpoints of polymerization stability and mechanical stability.

When the UV polymerization is performed, a photopolymerization initiator is preferably used.

Any appropriate photopolymerization initiator may be adopted as the photopolymerization initiator to such an extent that the effect of the present invention is not impaired. The photopolymerization initiators may be used alone or in combination thereof. Examples of such photopolymerization initiator include a benzoin ether-based photopolymerization initiator, an acetophenone-based photopolymerization initiator, an α-ketol-based photopolymerization initiator, an aromatic sulfonyl chloride-based photopolymerization initiator, a photoactive oxime-based photopolymerization initiator, a benzoin-based photopolymerization initiator, a benzil-based photopolymerization initiator, a benzophenone-based photopolymerization initiator, a ketal-based photopolymerization initiator, a thioxanthone-based photopolymerization initiator, and an acylphosphine oxide-based photopolymerization initiator.

Specific examples of the benzoin ether-based photopolymerization initiator include benzoin methyl ether, benzoin ethylether, benzoin propyl ether, benzoin isopropyl ether, benzoin isobutyl ether, 2,2-dimethoxy-1,2-diphenylethan-1-one (e.g., a commercial product available under the product name "Irgacure 651" from BASF), and anisole methyl ether.

Specific examples of the acetophenone-based photopolymerization initiator include 1-hydroxycyclohexyl phenyl ketone (e.g., a commercial product available under the product name "Irgacure 184" from BASF), 4-phenoxydichloroacetophenone, 4-t-butyl-dichloroacetophenone, 1-[4-(2-hydroxyethoxy)-phenyl]-2-hydroxy-2-methyl-1-propan-1-one (e.g., a commercial product available under the product name "Irgacure 2959" from BASF), 2-hydroxy-2-methyl-1-phenyl-propan-1-one (e.g., a commercial product available under the product name "DAROCUR 1173" from BASF), and methoxyacetophenone.

Specific examples of the α-ketol-based photopolymerization initiator include 2-methyl-2-hydroxypropiophenone and 1-[4-(2-hydroxyethyl)-phenyl]-2-hydroxy-2-methylpropan-1-one.

A specific example of the aromatic sulfonyl chloride-based photopolymerization initiator is 2-naphthalenesulfonyl chloride.

A specific example of the photoactive oxime-based photopolymerization initiator is 1-phenyl-1,1-propanedione-2-(o-ethoxycarbonyl)-oxime.

A specific example of the benzoin-based photopolymerization initiator is benzoin.

A specific example of the benzil-based photopolymerization initiator is benzil.

Specific examples of the benzophenone-based photopolymerization initiator include benzophenone, benzoylbenzoic acid, 3,3'-dimethyl-4-methoxybenzophenone, polyvinylbenzophenone, and α-hydroxycyclohexyl phenyl ketone.

A specific example of the ketal-based photopolymerization initiator is benzyl dimethyl ketal.

Specific examples of the thioxanthone-based photopolymerization initiator include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, isopropylthioxanthone, 2,4-diisopropylthioxanthone, and dodecylthioxanthone.

Specific examples of the acylphosphine-based photopolymerization initiator include bis(2,6-dimethoxybenzoyl)phenylphosphine oxide, bis(2,6-dimethoxybenzoyl)(2,4,4-trimethylpentyl)phosphine oxide, bis(2,6-dimethoxybenzoyl)-n-butylphosphine oxide, bis(2,6-dimethoxybenzoyl)-(2-methylpropan-1-yl)phosphine oxide, bis(2,6-dimethoxybenzoyl)-(1-methylpropan-1-yl)phosphine oxide, bis(2,6-dimethoxybenzoyl)-t-butylphosphine oxide, bis(2,6-dimethoxybenzoyl)cyclohexylphosphine oxide, bis(2,6-dimethoxybenzoyl)octylphosphine oxide, bis(2-methoxybenzoyl)(2-methylpropan-1-yl)phosphine oxide, bis(2-methoxybenzoyl)(1-methylpropan-1-yl)phosphine oxide, bis(2,6-diethoxybenzoyl)(2-methylpropan-1-yl)phosphine oxide, bis(2,6-diethoxybenzoyl)(1-methylpropan-1-yl)phosphine oxide, bis(2,6-dibutoxybenzoyl)(2-methylpropan-1-yl)phosphine oxide, bis(2,4-dimethoxybenzoyl)(2-methylpropan-1-yl)phosphine oxide, bis(2,4,6-trimethylbenzoyl)(2,4-dipentoxyphenyl)phosphine oxide, bis(2,6-dimethoxybenzoyl)benzylphosphine oxide, bis(2,6-dimethoxybenzoyl)-2-phenylpropylphosphine oxide, bis(2,6-dimethoxybenzoyl)-2-phenylethylphosphine oxide, bis(2,6-dimethoxybenzoyl)benzylphosphine oxide, bis(2,6-dimethoxybenzoyl)-2-phenylpropylphosphine oxide, bis(2,6-dimethoxybenzoyl)-2-phenylethylphosphine oxide, 2,6-dimethoxybenzoylbenzylbutylphosphine oxide, 2,6-dimethoxybenzoylbenzyloctylphosphine oxide, bis(2,4,6-trimethylbenzoyl)-2,5-diisopropylphenylphosphine oxide, bis(2,4,6-trimethylbenzoyl)-2-methylphenylphosphine oxide, bis(2,4,6-trimethylbenzoyl)-4-methylphenylphosphine oxide, bis(2,4,6-trimethylbenzoyl)-2,5-diethylphenylphosphine oxide, bis(2,4,6-trimethylbenzoyl)-2,3,5,6-tetramethylphenylphosphine oxide, bis(2,4,6-trimethylbenzoyl)-2,4-di-n-butoxyphenylphosphine oxide, 2,4,6-trimethylbenzoyldiphenylphosphine oxide, bis(2,6-dimethoxybenzoyl)-2,4,4-trimethylpentylphosphine oxide, bis(2,4,6-trimethylbenzoyl)isobutylphosphine oxide, 2,6-dimethoxybenzoyl-2,4,6-trimethylbenzoyl-n-butylphosphine oxide, bis(2,4,6-trimethylbenzoyl)phenylphosphine oxide, bis(2,4,6-trimethylbenzoyl)-2,4-dibutoxyphenylphosphine oxide, 1,10-bis[bis(2,4,6-trimethylbenzoyl)phosphine oxide]decane, and tri(2-methylbenzoyl)phosphine oxide.

The usage amount of the photopolymerization initiator is preferably 5 parts by weight or less, more preferably from 0.01 part by weight to 5 parts by weight, still more preferably from 0.05 part by weight to 3 parts by weight, particularly preferably from 0.05 part by weight to 1.5 parts by weight, most preferably from 0.1 part by weight to 1 part by weight with respect to 100 parts by weight of the total amount of the monomer component (m) from the viewpoint of, for example, the expression of satisfactory polymerizability.

When the UV polymerization is performed, a polyfunctional (meth)acrylate is preferably used.

Any appropriate polyfunctional (meth)acrylate may be adopted as the polyfunctional (meth)acrylate to such an extent that the effect of the present invention is not impaired. The polyfunctional (meth)acrylates may be used alone or in combination thereof. Specific examples of such polyfunctional (meth)acrylate include: ester compounds of polyhydric alcohols and (meth)acrylic acid, such as (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol penta(meth)acrylate, dipentaerythritol hexa(meth)acrylate, 1,2-ethylene glycol di(meth)acrylate, 1,6-hexanediol di(meth)acrylate, 1,12-dodecanediol di(meth)acrylate, trimethylolpropane tri(meth)acrylate, and tetramethylolmethane tri(meth)acrylate; allyl (meth)acrylate; vinyl (meth)acrylate; divinylbenzene; epoxy acrylate; polyester acrylate; urethane acrylate; butyl di(meth)acrylate; and hexyl di(meth)acrylate.

The usage amount of the polyfunctional (meth)acrylate is preferably 5 parts by weight or less, more preferably from 0.01 part by weight to 5 parts by weight, still more preferably from 0.05 part by weight to 3 parts by weight, particularly preferably from 0.05 part by weight to 1.5 parts by weight, most preferably from 0.1 part by weight to 1 part by weight with respect to 100 parts by weight of the total amount of the monomer component (m) from the viewpoint of, for example, the expression of satisfactory cross-linkability.

Any appropriate UV polymerization method may be adopted as a method for the UV polymerization to such an extent that the effect of the present invention is not impaired. Such UV polymerization method is, for example, as follows: the monomer component (m) is blended with the photopolymerization initiator, and as required, the polyfunctional (meth)acrylate, and the resultant is irradiated with UV light.

The weight-average molecular weight of the polymer component (P) is preferably from 100,000 to 3,000,000, more preferably from 300,000 to 2,000,000, still more preferably from 500,000 to 1,500,000, particularly preferably from 500,000 to 1,000,000 because the double-sided pressure-sensitive adhesive tape according to at least one embodiment of the present invention can express more excellent impact resistance. The weight-average molecular weight is a value measured by gel permeation chromatography (GPC) and calculated in terms of polystyrene. It may be difficult to measure the weight-average molecular weight of the polymer component (P) obtained by active energy ray polymerization.

<A-1-1-3. Tackifying Resin>

The pressure-sensitive adhesive composition may contain a tackifying resin. The tackifying resins may be used alone or in combination thereof.

Any appropriate tackifying resin may be adopted as the tackifying resin to such an extent that the effect of the present invention is not impaired. Examples of such tackifying resin include a phenol-based tackifying resin, a terpene-based tackifying resin, a modified terpene-based tackifying resin, a rosin-based tackifying resin, a hydrocarbon-based tackifying resin, an epoxy-based tackifying resin, a polyamide-based tackifying resin, an elastomer-based tackifying resin, and a ketone-based tackifying resin.

Examples of the phenol-based tackifying resin include a terpene-phenol resin, a hydrogenated terpene-phenol resin, an alkyl phenol resin, and a rosin-phenol resin. The terpene-phenol resin refers to a polymer including a terpene residue and a phenol residue, and is a concept including both of a copolymer of a terpene and a phenol compound (terpene-phenol copolymer resin) and a phenol-modified product of a homopolymer or a copolymer of a terpene (phenol-modified terpene resin). Examples of the terpene forming such terpene-phenol resin include monoterpenes, such as α-pinene, β-pinene, and limonene (including a d-form, an l-form, and a d/l-form (dipentene)). The hydrogenated terpene-phenol resin refers to a hydrogenated terpene-phenol resin having a structure obtained by hydrogenation of such terpene-phenol resin, and is sometimes referred to as hydrogenated terpene-phenol resin. The alkyl phenol resin is a resin (oil-based phenol resin) obtained from an alkyl phenol and formaldehyde. Examples of the alkylphenol resin include novolac-type and resol-type resins. Examples of the rosin-phenol resin include phenol-modified products of rosins or various rosin derivatives (including rosin esters, unsaturated fatty acid-modified rosins, and unsaturated fatty acid-modified rosin esters). The rosin-phenol resin is, for example, a rosin-phenol resin obtained by a method involving adding phenol to the rosins or the various rosin derivatives with an acid catalyst, and thermally polymerizing the resultant.

Examples of the terpene-based tackifying resin include polymers of terpenes, such as α-pinene, β-pinene, d-limonene, l-limonene, and dipentene (typically monoterpenes). A homopolymer of one kind of terpene is, for example, an α-pinene polymer, a β-pinene polymer, or a dipentene polymer.

Examples of the modified terpene resin include a styrene-modified terpene resin and a hydrogenated terpene resin.

The concept of the rosin-based tackifying resin includes both of the rosins and rosin derivative resins. Examples of the rosins include: unmodified rosins (raw rosins), such as gum rosin, wood rosin, and tall oil rosin; and modified rosins obtained by modifying these unmodified rosins through hydrogenation, disproportionation, polymerization, or the like (e.g., a hydrogenated rosin, a disproportionated rosin, a polymerized rosin, and any other chemically modified rosin).

Examples of the rosin derivative resins include: rosin esters, such as unmodified rosin esters that are esters of the unmodified rosins and alcohols, and modified rosin esters that are esters of the modified rosins and alcohols; unsaturated fatty acid-modified rosins obtained by modifying the rosins with unsaturated fatty acids; unsaturated fatty acid-modified rosin esters obtained by modifying the rosin esters with unsaturated fatty acids; rosin alcohols obtained by subjecting carboxy groups of the rosins or the rosin derivative resins (e.g., the rosin esters, the unsaturated fatty acid-modified rosins, and the unsaturated fatty acid-modified rosin esters) to reduction treatments; and metal salts thereof. Examples of the rosin esters include methyl esters, triethylene glycol esters, glycerin esters, and pentaerythritol esters of unmodified rosins or modified rosins (e.g., a hydrogenated rosin, a disproportionated rosin, and a polymerized rosin).

Examples of the hydrocarbon-based tackifying resin include an aliphatic hydrocarbon resin, an aromatic hydrocarbon resin, an aliphatic cyclic hydrocarbon resin, an aliphatic-aromatic petroleum resin (e.g., a styrene-olefin-based copolymer), an aliphatic-alicyclic petroleum resin, a hydrogenated hydrocarbon resin, a coumarone-based resin, and a coumarone-indene-based resin.

In the case of the form 1, the content of the tackifying resin in the pressure-sensitive adhesive composition is preferably from 1 part by weight to 50 parts by weight, more preferably from 5 parts by weight to 30 parts by weight, still more preferably from 8 parts by weight to 25 parts by weight, particularly preferably from 10 parts by weight to 20 parts by weight with respect to 100 parts by weight of the polymer component (P).

In the case of the form 2, the content of the tackifying resin in the pressure-sensitive adhesive composition is preferably from 1 part by weight to 50 parts by weight, more preferably from 5 parts by weight to 30 parts by weight, still more preferably from 8 parts by weight to 25 parts by weight, particularly preferably from 10 parts by weight to 20 parts by weight with respect to 100 parts by weight of the total amount of the monomer component (m).

In the case of the form 3, the content of the tackifying resin in the pressure-sensitive adhesive composition is preferably from 1 part by weight to 50 parts by weight, more preferably from 5 parts by weight to 30 parts by weight, still more preferably from 8 parts by weight to 25 parts by weight, particularly preferably from 10 parts by weight to 20 parts by weight with respect to 100 parts by weight of the sum total amount of the polymer component (P) and the monomer component (m).

<A-1-1-4. Cross-Linking Agent>

The pressure-sensitive adhesive composition may contain a cross-linking agent. The cross-linking agents may be used alone or in combination thereof. When the pressure-sensitive adhesive composition contains the cross-linking agent, the double-sided pressure-sensitive adhesive tape according to at least one embodiment of the present invention can express more excellent alcohol resistance.

Any appropriate cross-linking agent may be adopted as the cross-linking agent to such an extent that the effect of the present invention is not impaired. Examples of such cross-linking agent include an isocyanate-based cross-linking agent and a non-isocyanate-based cross-linking agent.

Any appropriate isocyanate-based cross-linking agent may be adopted as the isocyanate-based cross-linking agent to such an extent that the effect of the present invention is not impaired. Examples of such isocyanate-based cross-linking agent include an aromatic diisocyanate, an aliphatic diisocyanate, and an alicyclic diisocyanate, and dimers and trimers of those diisocyanates. Specific examples thereof include tolylene diisocyanate, diphenylmethane diisocyanate, hexamethylene diisocyanate, xylylene diisocyanate, hydrogenated xylylene diisocyanate, isophorone diisocyanate, hydrogenated diphenylmethane diisocyanate, 1,5-naphthylene diisocyanate, 1,3-phenylene diisocyanate, 1,4-phenylene diisocyanate, butane-1,4-diisocyanate, 2,2,4-trimethylhexamethylene diisocyanate, 2,4,4-trimethylhexamethylene diisocyanate, cyclohexane-1,4-diisocyanate, dicyclohexylmethane-4,4-diisocyanate, 1,3-bis(isocyanatomethyl)cyclohexane, methylcyclohexane diisocyanate, and m-tetramethylxylylene diisocyanate, and dimers and trimers thereof, and polyphenylmethane polyisocyanate. In addition, the trimer may be of, for example, an isocyanurate type, a biuret type, or an allophanate type.

A commercial product may be used as the isocyanate-based cross-linking agent. Examples of a commercial product of the polyisocyanate include a product available under the product name "TAKENATE 600" from Mitsui Chemicals, Inc., a product available under the product name "DURANATE TPA100" from Asahi Kasei Chemicals Corporation, and products available under the product names "CORONATE L", "CORONATE HL", "CORONATE HK", "CORONATE HX", and "CORONATE 2096" from Nippon Polyurethane Industry Co., Ltd.

Examples of the non-isocyanate-based cross-linking agent include an epoxy-based cross-linking agent, an oxazoline-based cross-linking agent, an aziridine-based cross-linking agent, a melamine-based cross-linking agent, a carbodiimide-based cross-linking agent, a hydrazine-based cross-linking agent, an amine-based cross-linking agent, a peroxide-based cross-linking agent, a metal chelate-based cross-linking agent, a metal alkoxide-based cross-linking agent, a metal salt-based cross-linking agent, and a silane coupling agent.

In at least one exemplary embodiment of the present invention, the epoxy-based cross-linking agent may be adopted as the non-isocyanate-based cross-linking agent. The epoxy-based cross-linking agent is preferably, for example, a compound having 2 or more epoxy groups in a molecule thereof, and is more preferably, for example, an epoxy-based cross-linking agent having 3 to 5 epoxy groups in a molecule thereof.

Specific examples of the epoxy-based cross-linking agent include N,N,N',N'-tetraglycidyl-m-xylenediamine, 1,3-bis(N,N-diglycidylaminomethyl)cyclohexane, 1,6-hexanediol diglycidyl ether, polyethylene glycol diglycidyl ether, and polyglycerol polyglycidyl ether. Examples of a commercial product of the epoxy-based cross-linking agent include products available under the product names "TETRAD-C" and "TETRAD-X" from Mitsubishi Gas Chemical Company, a product available under the product name "EPICLON CR-5L" from DIC Corporation, a product available under the product name "DENACOL EX-512" from Nagase ChemteX Corporation, and a product available under the product name "TEPIC-G" from Nissan Chemical Industries, Ltd.

In the case of the form 1, the content of the cross-linking agent in the pressure-sensitive adhesive composition is preferably from 0.01 part by weight to 10 parts by weight, more preferably from 0.1 part by weight to 8 parts by weight, still more preferably from 0.5 part by weight to 7 parts by weight, particularly preferably from 1.5 parts by weight to 5 parts by weight with respect to 100 parts by weight of the polymer component (P). When the content of the cross-linking agent in the pressure-sensitive adhesive composition falls within the ranges, a double-sided pressure-sensitive adhesive tape that can express all of more excellent impact resistance, more excellent reworkability, and more excellent alcohol resistance can be provided.

In the case of the form 2, the content of the cross-linking agent in the pressure-sensitive adhesive composition is preferably from 0.01 part by weight to 10 parts by weight, more preferably from 0.1 part by weight to 8 parts by weight, still more preferably from 0.5 part by weight to 7 parts by weight, particularly preferably from 1.5 parts by weight to 3 parts by weight with respect to 100 parts by weight of the total amount of the monomer component (m). When the content of the cross-linking agent in the pressure-sensitive adhesive composition falls within the ranges, a double-sided pressure-sensitive adhesive tape that can express all of more excellent impact resistance, more excellent reworkability, and more excellent alcohol resistance can be provided.

In the case of the form 3, the content of the cross-linking agent in the pressure-sensitive adhesive composition is preferably from 0.01 part by weight to 10 parts by weight, more preferably from 0.1 part by weight to 8 parts by weight, still more preferably from 0.5 part by weight to 7 parts by weight, particularly preferably from 1.5 parts by weight to 3 parts by weight with respect to 100 parts by weight of the sum total amount of the polymer component (P) and the monomer component (m). When the content of the cross-linking agent in the pressure-sensitive adhesive composition falls within the ranges, a double-sided pressure-sensitive adhesive tape that can express all of more excellent impact resistance, more excellent reworkability, and more excellent alcohol resistance can be provided.

In the pressure-sensitive adhesive composition, the isocyanate-based cross-linking agent and the non-isocyanate-based cross-linking agent (e.g., the epoxy-based cross-linking agent) may be used in combination. In this case, the ratio of the content of the non-isocyanate-based cross-linking agent in the pressure-sensitive adhesive composition to the content of the isocyanate-based cross-linking agent in the pressure-sensitive adhesive composition is preferably 1/50 or less, more preferably 1/75 or less, still more preferably 1/100 or less, particularly preferably 1/150 or less because the double-sided pressure-sensitive adhesive tape according to at least one embodiment of the present invention can express more excellent oil resistance. In addition, the ratio of the content of the non-isocyanate-based cross-linking agent in the pressure-sensitive adhesive composition to the content of the isocyanate-based cross-linking agent in the pressure-sensitive adhesive composition is preferably 1/1,000 or more, more preferably 1/500 or more because the double-sided pressure-sensitive adhesive tape according to at least one embodiment of the present invention can express more excellent oil resistance.

<A-2. Base Material Layer>

The base material layer may be a single layer, or may include two or more layers. In the case of two or more layers, all of the base material layers may have the same composition, or at least one of the base material layers may be different from the other (s) in composition.

The thickness of the base material layer is preferably from 5 μm to 50 μm because the effect of the present invention can be further expressed, and the thickness is more preferably from 5 μm to 30 μm, still more preferably from 10 μm to 30 μm.

The base material layer is preferably formed of a resin film containing a resin material as a main component.

As used herein, the term "main component" means a component blended at the highest ratio, typically a component contained at more than 50 wt %.

The content of the resin material in the resin film is preferably more than 50 wt % and 100 wt % or less, more preferably from 60 wt % to 100 wt %, still more preferably from 70 wt % to 100 wt %, still more preferably from 80 wt % to 100 wt %, particularly preferably from 90 wt % to 100 wt %, most preferably from 95 wt % to 100 wt %.

As used herein, the term "resin film" typically refers to a substantially unfoamed resin film. That is, herein, the resin film may be substantially free of cells that are present inside the resin film (voidless). Therefore, herein, the concept of "resin film" is distinguished from a so-called foam film. In addition, herein, the resin film is typically a substantially non-porous film, which is a concept to be distinguished from a so-called nonwoven fabric or woven fabric. Herein, the following may be preferably adopted as the resin film: a base material free of a porous layer, such as a foam, a nonwoven fabric, or a woven fabric, that is, a base material formed of a non-porous layer. The resin film generally tends to be excellent in mechanical strength, such as tensile strength, as compared to a foam, a nonwoven fabric, or a woven fabric.

Examples of the resin material for forming the resin film include a polyolefin-based resin (e.g., polyethylene, polypropylene, an ethylene-propylene copolymer, or an ethylene-vinyl acetate copolymer), a polyvinyl chloride-based resin (typically a soft polyvinyl chloride-based resin), a polyvinyl acetate-based resin, a polyurethane-based resin (e.g., ether-based polyurethane, ester-based polyurethane, or carbonate-based polyurethane), a urethane (meth)acrylate-based resin, a thermoplastic elastomer (e.g., an olefin-based elastomer, a styrene-based elastomer, or an acrylic elastomer), a polyester-based resin (e.g., polyethylene terephthalate, polybutylene terephthalate, polyethylene naphthalate, or polybutylene naphthalate), a polycarbonate-based resin, a polyamide-based resin, a polyimide-based resin, a fluororesin, and a cellulose-based resin, such as a cellophane resin. Those resin materials may be used alone or in combination thereof. A preferred example of the resin material for forming the resin film is at least one kind selected from the group consisting of a polyolefin-based resin, a polyvinylchloride-based resin, a polyurethane-based resin, and a polyester-based resin, a more preferred example is a polyolefin-based resin or a polyurethane-based resin, and a still more preferred example is a polyurethane-based resin. That is, a preferred example of the resin film is at least one kind selected from the group consisting of a polyolefin-based resin film, a polyvinyl chloride-based resin film, a polyurethane-based resin film, and a polyester-based resin film, a more preferred example is a polyolefin-based resin film or a polyurethane-based resin film, and a still more preferred example is a polyurethane-based resin film. When the resin film is the above-mentioned resin film, a pressure-sensitive adhesive tape that can express both of more excellent impact resistance and more excellent reworkability can be provided.

In at least one exemplary embodiment of the present invention, the base material layer is a polyurethane-based resin film containing a polyurethane-based resin as a main component. The polyurethane-based resin film is typically formed from a material showing substantially no yield point. The polyurethane-based resin film can also achieve satisfactory physical properties without even the addition of, for example, an additive component, such as a plasticizer, and hence can serve as a base material layer that is preferred in the technology disclosed herein also because of the prevention of such additive component from bleeding out.

Specifically, the content of the polyurethane-based resin in the polyurethane-based resin film as a whole is preferably from 50 wt % to 100 wt %, more preferably from 70 wt % to 100 wt %, still more preferably from 90 wt % to 100 wt %, particularly preferably from 95 wt % to 100 wt %, most preferably substantially 100 wt %. When the resin film as a whole contains the polyurethane-based resin as a main component, the effect of the present invention can be further expressed.

Herein, a case described as "substantially 100 wt %" means that a trace amount of an impurity or the like may be contained to such an extent that the effect of the present invention is not impaired, and such case may be generally described as "100 wt %".

The polyurethane-based resin film may be a film formed of a polymer blend of the polyurethane-based resin and another resin. The other resin is preferably, for example, at least one kind selected from the group consisting of an acrylic resin, a polyolefin-based resin, a polyester-based resin, and a polycarbonate-based resin.

The polyurethane-based resin is a polymer compound synthesized by subjecting a polyol (e.g., a diol) and a polyisocyanate (e.g., a diisocyanate) to a polyaddition reaction at a predetermined ratio. The NCO/OH ratio of polyurethane only needs to be appropriately set on the basis of common general technical knowledge of a person skilled in the art so as to achieve desired mechanical characteristics (e.g., breaking strength, elongation at break, and tensile recovery).

Examples of the polyol that may be used in the synthesis of the polyurethane-based resin include: a diol, such as ethylene glycol, propylene glycol, 1,3-propanediol, 1,4-butanediol, 1,5-pentanediol, neopentylglycol, 1,6-hexanediol, 1,8-octanediol, polyoxytetramethylene glycol, diethylene glycol, polyethylene glycol, or polypropylene glycol; a polyester polyol, which is a polycondensate of the diol and a dicarboxylic acid (e.g., adipic acid, azelaic acid, or sebacic acid); and a carbonate diol, such as a polyalkylene carbonate diol. Those polyols may be used alone or in combination thereof.

Examples of the polyisocyanate that may be used in the synthesis of the polyurethane-based resin include aromatic, aliphatic, and alicyclic diisocyanates, and multimers (e.g. dimers and trimers) of the diisocyanates. Examples of the diisocyanates include tolylene diisocyanate, diphenylmethane diisocyanate, hexamethylene diisocyanate, xylylene diisocyanate, hydrogenated xylylene diisocyanate, isophorone diisocyanate, hydrogenated diphenylmethane diisocyanate, 1,5-naphthylene diisocyanate, 1,3-phenylene diisocyanate, 1,4-phenylene diisocyanate, butane-1,4-diisocyanate, 2,2,4-trimethylhexamethylene diisocyanate, 2,4,4-trimethylhexamethylene diisocyanate, cyclohexane-1,4-diisocyanate, dicyclohexylmethane-4,4-diisocyanate, 1,3-bis(isocyanatomethyl)cyclohexane, methylcyclohexane diisocyanate, and m-tetramethylxylylene diisocyanate. Those diisocyanates may be used alone or in combination thereof. Of the diisocyanates, an aromatic diisocyanate is preferred because the effect of the present invention can be further expressed.

Another copolymerization component may be introduced into the polyurethane-based resin in addition to the polyol and the polyisocyanate. Examples of the other copolymerization component include a monocarboxylic acid, a dicarboxylic acid, a polycarboxylic acid that is tri- or higher functional, a hydroxycarboxylic acid, an alkoxycarboxylic acid, and derivatives thereof. The other copolymerization components may be used alone or in combination thereof.

It is appropriate that the ratio of the other copolymerization component be set to about less than 30 wt % (e.g., less than 10 wt %, typically less than 5 wt %) in the polyurethane-based resin.

In the case where the polyurethane-based resin is adopted as the resin material for forming the resin film, the polyurethane-based resin preferably contains thermoplastic polyurethane because the effect of the present invention can be sufficiently expressed. The number of kinds of the thermoplastic polyurethane may be only one, or two or more.

In the above-mentioned case, the content of the thermoplastic polyurethane in the polyurethane-based resin is preferably from 50 wt % to 100 wt %, more preferably from 70 wt % to 100 wt %, still more preferably from 90 wt % to 100 wt %, particularly preferably from 95 wt % to 100 wt %, most preferably substantially 100 wt %. When the resin film as a whole contains the thermoplastic polyurethane as a main component, the effect of the present invention can be further expressed.

Any appropriate thermoplastic polyurethane may be adopted as the thermoplastic polyurethane to such an extent that the effect of the present invention is not impaired. An example of such thermoplastic polyurethane, which is generally called TPU, is a block copolymer containing a hard segment and a soft segment. A preferred example of such thermoplastic polyurethane is at least one kind selected from the group consisting of polyester-based TPU, polyether-based TPU, and polycarbonate-based TPU because the effect of the present invention can be more sufficiently expressed.

A commercial product may be adopted as the thermoplastic polyurethane.

The base material layer may contain any appropriate additive as required. Examples of the additive that may be contained in the base material layer include a release agent, a UV absorber, a heat stabilizer, a filler, a lubricant, a colorant (e.g., a dye), an antioxidant, an anti-build up agent, an anti-blocking agent, a foaming agent, and polyethyleneimine. Those additives may be used alone or in combination thereof. The content of the additive in the base material layer is preferably 10 wt % or less, more preferably 7 wt % or less, still more preferably 5 wt % or less, particularly preferably 2 wt % or less, most preferably 1 wt % or less.

<<B. Method of Producing Double-Sided Pressure-Sensitive Adhesive Tape>>

The double-sided pressure-sensitive adhesive tape according to at least one embodiment of the present invention may be produced by any appropriate method to such an extent that the effect of the present invention is not impaired. The following method is given as an example of such method: the pressure-sensitive adhesive layers are separately prepared, and are bonded to the base material layer by any appropriate method. When a case in which the double-sided pressure-sensitive adhesive tape according to at least one embodiment of the present invention includes, as illustrated in FIG. 1, the pressure-sensitive adhesive layers on both surface sides of the base material layer is taken as an example, an example of the method is a method involving bonding two pressure-sensitive adhesive layers to both surfaces of the base material layer, respectively. For example, a laminator may be used in the bonding. In addition, after the bonding, aging may be performed under any appropriate temperature for any appropriate time period as required.

EXAMPLES

Now, the present invention is described specifically by way of Examples. However, the present invention is by no means limited to Examples. Test and evaluation methods in Examples and the like are as described below. The term "part(s)" in the following description means "part (s) by weight" unless otherwise specified, and the term "%" in the following description means "wt %" unless otherwise specified.

<Weight-Average Molecular Weight>

A weight-average molecular weight was determined from a value in terms of standard polystyrene obtained by gel permeation chromatography (GPC). An apparatus available under the model name "HLC-8320 GPC" (column: TSKgel GMH-H(S), manufactured by Tosoh Corporation) was used as a GPC apparatus.

<Force at 100% Strain>

A double-sided pressure-sensitive adhesive sheet was punched with a dumbbell-shaped punching blade (manufactured by Kobunshi Keiki Co., Ltd., product name: Dumbbell No. 3 Shape Die), and its release liner was removed. Thus, a measurement sample was produced. The measurement sample was set in a tensile tester ("PRECISION UNIVERSAL TESTER AUTOGRAPH AG-IS 50N" manufactured by Shimadzu Corporation) so that both ends of the measurement sample were symmetric and the length of the double-sided tape punched into a dumbbell shape was 20 mm in a tensile direction. After that, the measurement sample was pulled at a rate of 50 mm/min, and the stress (N) of the measurement sample at 100% elongation was recorded. Next, a force at 100% strain was calculated from the following equation.

(Force at 100% strain)=(stress at 100% elongation)/ (width of measurement sample)

<Impact Resistance>

A double-sided pressure-sensitive adhesive tape sandwiched between release liners was punched into a frame shape having a width of 2 mm and an outer shape of 24.5-millimeter square to provide an evaluation sample. The evaluation sample was arranged between a square stainless-steel plate having a thickness of 2 mm and an outer shape measuring 50 mm by 50 mm, the plate having a hole measuring 20 mm long by 20 mm wide in its central portion, and a square stainless-steel plate (having an outer shape of 25 mm square and a thickness of 3 mm), and was pressure-bonded onto the plates (62 N×10 seconds) so that a force was uniformly applied to the sample in the gravity direction. After that, the resultant was left at rest under 80° C. for 30 minutes and taken out. After that, the resultant was returned to an environment at 23° C. to provide a test piece. A columnar measuring stand having a length of 50 mm, an outer diameter of 49 mm, and an inner diameter of 43 mm was arranged on the pedestal of a Du Pont-type impact tester (manufactured by Toyo Seiki Seisaku-sho, Ltd.), and the test piece was mounted thereon so that the square stainless-steel plate was on a lower side. A stainless-steel impact shaft having a tip radius of 3.1 mm was mounted on the test piece, and the weight of a falling weight and its falling height were changed as follows to increase energy until the peeling of the tape occurred: when the weight was 100 g, the height was changed from 50 mm to 500 mm in increments of 50 mm; when the weight was 150 g, the height was changed from 350 mm to 500 mm in increments of 50 mm; when the weight was 200 g, the height was changed from 400 mm to 500 mm in increments of 50 mm; and when the weight was 300 g, the height was changed from 350 mm to 500 mm in increments of 50 mm. At this time, no test was performed for energy that had already been evaluated, and the load and the height were set so that the amounts of energy did not overlap each other. After that, energy immediately before the peeling was calculated from the expression "load×height", and was adopted as a result. An energy until the peeling of 0.3 J or more is required in actual use.

<Alcohol Resistance Measurement>

A PET film (without release treatment) having a thickness of 50 μm was bonded to one pressure-sensitive adhesive layer surface of a double-sided pressure-sensitive adhesive tape obtained in each of Examples and Comparative Examples to back the surface. The backed pressure-sensitive adhesive tape was cut into a size measuring 10 mm wide by 100 mm long to produce a sample piece.

By one pass back and forth with a 2 kg roller, the pressure-sensitive adhesive layer surface of the resultant test piece was pressure-bonded to a stainless-steel plate (SUS304BA plate) (manufactured by Nippon Kinzoku Co., Ltd.) that had been washed with toluene, to thereby produce a measurement sample. The measurement sample was left to stand under an environment at 23° C. and 50% RH for 30 minutes, and then its peel strength (N/10 mm) was measured with a tensile tester (manufactured by Shimadzu Corporation, "PRECISION UNIVERSAL TESTER, AUTOGRAPH AG-IS 50N") in conformity with JIS Z 0237:2000 under the conditions of a tensile rate of 300 mm/min and a peel angle of 180°. This value was defined as a pre-immersion pressure-sensitive adhesive strength AG (N/10 mm). Meanwhile, a measurement sample produced in the same manner as that described above was left to stand under an environment at 23° C. and 50% RH for 30 minutes. After that, the measurement sample was immersed in an isopropyl alcohol bath, and was held under an environment at 40° C. and 90% RH for 24 hours. After that, the measurement sample was pulled up from the isopropyl alcohol bath, and an isopropyl alcohol solution adhering to its periphery was lightly wiped off. The measurement sample was left to stand under an environment at 23° C. and 50% RH for 30 minutes, and then its peel strength A1 (N/10 mm) was measured in the same manner as in the pre-immersion pressure-sensitive adhesive strength. This value was defined as a post-immersion pressure-sensitive adhesive strength. A pressure-sensitive adhesive strength maintenance ratio was calculated from the measured values thus obtained by using the following equation: pressure-sensitive adhesive strength maintenance ratio (%)=(post-immersion pressure-sensitive adhesive strength A1/pre-immersion pressure-sensitive adhesive strength A0)×100, and alcohol resistance was evaluated by the following rank evaluation. A pressure-sensitive adhesive strength maintenance ratio of 75% or more is required in actual use.

Rank 1: The pressure-sensitive adhesive strength maintenance ratio is less than 50%.
Rank 2: The pressure-sensitive adhesive strength maintenance ratio is 50% or more and less than 75%.
Rank 3: The pressure-sensitive adhesive strength maintenance ratio is 75% or more and less than 85%.
Rank 4: The pressure-sensitive adhesive strength maintenance ratio is 85% or more and less than 95%.
Rank 5: The pressure-sensitive adhesive strength maintenance ratio is 95% or more.

<Reworkability>

The double-sided pressure-sensitive adhesive tape obtained in each of Examples and Comparative Examples sandwiched between release liners on both sides was cut into a size measuring 10 mm wide by 50 mm long to produce a test piece.

One release liner of the test piece was peeled off, and the pressure-sensitive adhesive layer surface of the test piece was pressure-bonded onto a stainless-steel plate (SUS304BA plate) (manufactured by Nippon Kinzoku Co., Ltd.) that had been washed with toluene by one pass back and forth with a 2 kg roller. The resultant was stored under heating at 50° C. for 24 hours. After that, the other release liner was peeled off, and a short-side end portion of the test piece was peeled from the stainless-steel plate and continued to be pulled at an angle of 30 with respect to the adherend to determine reworkability. The reworkability was evaluated by the following criteria. Reworkability corresponding to 3 or more in the following criteria is required in actual use.

Rank 1: The tape is torn and unable to be peeled off.
Rank 2: The tape can be peeled off without being torn by being pulled at a rate of less than 0.5 m/min.
Rank 3: The tape can be peeled off without being torn by being pulled at a rate of 0.5 m/min or more and less than 1.0 m/min.
Rank 4: The tape can be peeled off without being torn by being pulled at a rate of 1.0 m/min or more and less than 5.0 m/min.
Rank 5: The tape can be peeled off even when pulled at a rate of 5.0 m/min or more.

[Production Example 1]: Production of Pressure-Sensitive Adhesive Layer (1)

95 Parts of butyl acrylate (BA) and 5 parts of acrylic acid (AA) serving as monomer components, and 233 parts of ethyl acetate serving as a polymerization solvent were loaded into a reaction vessel including a stirring machine, a temperature gauge, a nitrogen gas-introducing tube, a reflux condenser, and a dropping funnel, and were stirred for 2 hours while a nitrogen gas was introduced into the vessel. After oxygen in the polymerization system had been removed as described above, 0.2 part of 2,2'-azobisisobutyronitrile was added as a polymerization initiator to the mixture, and the whole was subjected to solution polymerization at 60° C. for 8 hours to provide a solution of an acrylic polymer. The acrylic polymer had a weight-average molecular weight of 700,000.

20 Parts of a terpene-phenol resin (product name: "YS POLYSTER T-115", softening point: about 115° C., hydroxyl value: from 30 mgKOH/g to 60 mgKOH/g, manufactured by Yasuhara Chemical Co., Ltd.) serving as a tackifying resin, 3 parts of an isocyanate-based cross-linking agent (product name: "CORONATE L", 75% solution of a trimethylolpropane/tolylene diisocyanate trimer adduct in ethyl acetate, manufactured by Tosoh Corporation) and 0.02 part of an epoxy-based cross-linking agent (product name: "TETRAD-C", 1,3-bis(N,N-diglycidylaminomethyl)cyclohexane, manufactured by Mitsubishi Gas Chemical Company, Inc.) serving as cross-linking agents, and 6 parts of a product available under the product name "AT-DN101 BLACK" (manufactured by Dainichiseika Color & Chemicals Mfg. Co., Ltd.) serving as a black pigment with respect to 100 parts of the acrylic polymer in the resultant acrylic polymer solution were added to the solution, and the contents were stirred and mixed to prepare a pressure-sensitive adhesive composition (1).

The pressure-sensitive adhesive composition (1) was applied to the release surface of a polyester release liner having a thickness of 38 µm (product name: "DIAFOIL MRF", manufactured by Mitsubishi Polyester Film, Inc.), and was dried at 100° C. for 2 minutes to form a pressure-sensitive adhesive layer (1) having a thickness of 97.5 µm.

[Production Example 2]: Production of Pressure-Sensitive Adhesive Layer (2)

A pressure-sensitive adhesive layer (2) having a thickness of 92.5 µm was formed in the same manner as in Production Example 1 except that: the usage amount of the isocyanate-based cross-linking agent (product name: "CORONATE L", 75% solution of a trimethylolpropane/tolylene diisocyanate trimer adduct in ethyl acetate, manufactured by Tosoh Corporation) was changed to 5 parts; and the thickness of the finished pressure-sensitive adhesive layer was set to 92.5 µm.

[Production Example 3]: Production of Pressure-Sensitive Adhesive Layer (3)

A pressure-sensitive adhesive layer (3) having a thickness of 87.5 µm was formed in the same manner as in Production Example 1 except that: the usage amount of the isocyanate-based cross-linking agent (product name: "CORONATE L", 75% solution of a trimethylolpropane/tolylene diisocyanate trimer adduct in ethyl acetate, manufactured by Tosoh Corporation) was changed to 5 parts; and the thickness of the finished pressure-sensitive adhesive layer was set to 87.5 µm.

[Production Example 4]: Production of Pressure-Sensitive Adhesive Layer (4)

A pressure-sensitive adhesive layer (4) having a thickness of 80.0 µm was formed in the same manner as in Production Example 1 except that the thickness of the finished pressure-sensitive adhesive layer was set to 80.0 µm.

[Production Example 5]: Production of Pressure-Sensitive Adhesive Layer (5)

A pressure-sensitive adhesive layer (5) having a thickness of 85.0 µm was formed in the same manner as in Production Example 1 except that the thickness of the finished pressure-sensitive adhesive layer was set to 85.0 µm.

[Production Example 6]: Production of Pressure-Sensitive Adhesive Layer (6)

93 Parts of butyl acrylate (BA) and 7 parts of acrylic acid (AA) serving as monomer components, and 233 parts of ethyl acetate serving as a polymerization solvent were loaded into a reaction vessel including a stirring machine, a temperature gauge, a nitrogen gas-introducing tube, a reflux condenser, and a dropping funnel, and were stirred for 2 hours while a nitrogen gas was introduced into the vessel. After oxygen in the polymerization system had been removed as described above, 0.2 part of 2,2'-azobisisobutyronitrile was added as a polymerization initiator to the mixture, and the whole was subjected to solution polymerization at 60° C. for 8 hours to provide a solution of an acrylic polymer. The acrylic polymer had a weight-average molecular weight of 1,400,000.

20 Parts of a terpene-phenol resin (product name: "YS POLYSTER T-115", softening point: about 115° C., hydroxyl value: from 30 mgKOH/g to 60 mgKOH/g, manufactured by Yasuhara Chemical Co., Ltd.) serving as a tackifying resin, 3 parts of an isocyanate-based cross-linking agent (product name: "CORONATE L", 75% solution of a trimethylolpropane/tolylene diisocyanate trimer adduct in ethyl acetate, manufactured by Tosoh Corporation) and 0.02 part of an epoxy-based cross-linking agent (product name: "TETRAD-C", 1,3-bis(N,N-diglycidylaminomethyl)cyclohexane, manufactured by Mitsubishi Gas Chemical Company, Inc.) serving as cross-linking agents, and 6 parts of a product available under the product name "AT-DN101 BLACK" (manufactured by Dainichiseika Color & Chemicals Mfg. Co., Ltd.) serving as a black pigment with respect to 100 parts of the acrylic polymer in the resultant acrylic polymer solution were added to the solution, and the contents were stirred and mixed to prepare a pressure-sensitive adhesive composition (6).

The pressure-sensitive adhesive composition (6) was applied to the release surface of a polyester release liner having a thickness of 38 µm (product name: "DIAFOIL MRF", manufactured by Mitsubishi Polyester Film, Inc.), and was dried at 100° C. for 2 minutes to form a pressure-sensitive adhesive layer (6) having a thickness of 87.5 µm.

[Production Example 7]: Production of Pressure-Sensitive Adhesive Layer (7)

97 Parts of butyl acrylate (BA) and 3 parts of acrylic acid (AA) serving as monomer components, and 233 parts of ethyl acetate serving as a polymerization solvent were loaded into a reaction vessel including a stirring machine, a temperature gauge, a nitrogen gas-introducing tube, a reflux condenser, and a dropping funnel, and were stirred for 2 hours while a nitrogen gas was introduced into the vessel. After oxygen in the polymerization system had been removed as described above, 0.2 part of 2,2'-azobisisobutyronitrile was added as a polymerization initiator to the mixture, and the whole was subjected to solution polymerization at 60° C. for 8 hours to provide a solution of an acrylic polymer. The acrylic polymer had a weight-average molecular weight of 600,000.

20 Parts of a terpene-phenol resin (product name: "YS POLYSTER T-115", softening point: about 115° C., hydroxyl value: from 30 mgKOH/g to 60 mgKOH/g, manufactured by Yasuhara Chemical Co., Ltd.) serving as a tackifying resin, 3 parts of an isocyanate-based cross-linking agent (product name: "CORONATE L", 75% solution of a trimethylolpropane/tolylene diisocyanate trimer adduct in ethyl acetate, manufactured by Tosoh Corporation) and 0.02 part of an epoxy-based cross-linking agent (product name: "TETRAD-C", 1,3-bis(N,N-diglycidylaminomethyl)cyclohexane, manufactured by Mitsubishi Gas Chemical Company, Inc.) serving as cross-linking agents, and 6 parts of a product available under the product name "AT-DN101 BLACK" (manufactured by Dainichiseika Color & Chemicals Mfg. Co., Ltd.) serving as a black pigment with respect to 100 parts of the acrylic polymer in the resultant acrylic polymer solution were added to the solution, and the contents were stirred and mixed to prepare a pressure-sensitive adhesive composition (7).

The pressure-sensitive adhesive composition (7) was applied to the release surface of a polyester release liner having a thickness of 38 μm (product name: "DIAFOIL MRF", manufactured by Mitsubishi Polyester Film, Inc.), and was dried at 100° C. for 2 minutes to form a pressure-sensitive adhesive layer (7) having a thickness of 87.5 μm.

[Production Example 8]: Production of Pressure-Sensitive Adhesive Layer (8)

93 Parts of butyl acrylate (BA), 7 parts of acrylic acid (AA), and 0.05 part of 4-hydroxybutyl acrylate (4HBA) serving as monomer components, and 233 parts of ethyl acetate serving as a polymerization solvent were loaded into a reaction vessel including a stirring machine, a temperature gauge, a nitrogen gas-introducing tube, a reflux condenser, and a dropping funnel, and were stirred for 2 hours while a nitrogen gas was introduced into the vessel. After oxygen in the polymerization system had been removed as described above, 0.1 part of 2,2'-azobisisobutyronitrile was added as a polymerization initiator to the mixture, and the whole was subjected to solution polymerization at 60° C. for 8 hours to provide a solution of an acrylic polymer. The acrylic polymer had a weight-average molecular weight of 600,000.

20 Parts of a terpene-phenol resin (product name: "YS POLYSTER T-115", softening point: about 115° C., hydroxyl value: from 30 mgKOH/g to 60 mgKOH/g, manufactured by Yasuhara Chemical Co., Ltd.) serving as a tackifying resin, 2 parts of an isocyanate-based cross-linking agent (product name: "CORONATE L", 75% solution of a trimethylolpropane/tolylene diisocyanate trimer adduct in ethyl acetate, manufactured by Tosoh Corporation) and 0.02 part of an epoxy-based cross-linking agent (product name: "TETRAD-C", 1,3-bis(N,N-diglycidylaminomethyl)cyclohexane, manufactured by Mitsubishi Gas Chemical Company, Inc.) serving as cross-linking agents, and 6 parts of a product available under the product name "AT-DN101 BLACK" (manufactured by Dainichiseika Color & Chemicals Mfg. Co., Ltd.) serving as a black pigment with respect to 100 parts of the acrylic polymer in the resultant acrylic polymer solution were added to the solution, and the contents were stirred and mixed to prepare a pressure-sensitive adhesive composition (8).

The pressure-sensitive adhesive composition (8) was applied to the release surface of a polyester release liner having a thickness of 38 μm (product name: "DIAFOIL MRF", manufactured by Mitsubishi Polyester Film, Inc.), and was dried at 100° C. for 2 minutes to form a pressure-sensitive adhesive layer (8) having a thickness of 87.5 μm.

[Production Example 9]: Production of Pressure-Sensitive Adhesive Layer (9)

A pressure-sensitive adhesive layer (9) having a thickness of 100.0 μm was formed in the same manner as in Production Example 1 except that the thickness of the finished pressure-sensitive adhesive layer was set to 100.0 μm.

[Production Example 10]: Production of Pressure-Sensitive Adhesive Layer (10)

90 Parts of butyl acrylate (BA) and 10 parts of acrylic acid (AA) serving as monomer components, and 350 parts of ethyl acetate serving as a polymerization solvent were loaded into a reaction vessel including a stirring machine, a temperature gauge, a nitrogen gas-introducing tube, a reflux condenser, and a dropping funnel, and were stirred for 2 hours while a nitrogen gas was introduced into the vessel. After oxygen in the polymerization system had been removed as described above, 0.2 part of 2,2'-azobisisobutyronitrile was added as a polymerization initiator to the mixture, and the whole was subjected to solution polymerization at 60° C. for 8 hours to provide a solution of an acrylic polymer. The acrylic polymer had a weight-average molecular weight of 600,000.

20 Parts of a terpene-phenol resin (product name: "YS POLYSTER T-115", softening point: about 115° C., hydroxyl value: from 30 mgKOH/g to 60 mgKOH/g, manufactured by Yasuhara Chemical Co., Ltd.) serving as a tackifying resin, 3 parts of an isocyanate-based cross-linking agent (product name: "CORONATE L", 75% solution of a trimethylolpropane/tolylene diisocyanate trimer adduct in ethyl acetate, manufactured by Tosoh Corporation) and 0.02 part of an epoxy-based cross-linking agent (product name: "TETRAD-C", 1,3-bis(N,N-diglycidylaminomethyl)cyclohexane, manufactured by Mitsubishi Gas Chemical Company, Inc.) serving as cross-linking agents, and 6 parts of a product available under the product name "AT-DN101 BLACK" (manufactured by Dainichiseika Color & Chemicals Mfg. Co., Ltd.) serving as a black pigment with respect to 100 parts of the acrylic polymer in the resultant acrylic polymer solution were added to the solution, and the contents were stirred and mixed to prepare a pressure-sensitive adhesive composition (10).

The pressure-sensitive adhesive composition (10) was applied to the release surface of a polyester release liner having a thickness of 38 μm (product name: "DIAFOIL MRF", manufactured by Mitsubishi Polyester Film, Inc.), and was dried at 100° C. for 2 minutes to form a pressure-sensitive adhesive layer (10) having a thickness of 87.5 μm.

[Production Example 11]: Production of Pressure-Sensitive Adhesive Layer (11)

A pressure-sensitive adhesive layer (11) having a thickness of 12.5 μm was formed in the same manner as in Production Example 1 except that the thickness of the finished pressure-sensitive adhesive layer was set to 12.5 μm.

[Production Example 12]: Production of Pressure-Sensitive Adhesive Layer (12)

A pressure-sensitive adhesive layer (12) having a thickness of 65.0 μm was formed in the same manner as in Production Example 1 except that the thickness of the finished pressure-sensitive adhesive layer was set to 65.0 μm.

Example 1

The side of the pressure-sensitive adhesive layer (1) obtained in Production Example 1 on which the release liner was not arranged was bonded to each of both surfaces of a polyester-based polyurethane resin film (manufactured by Okura Industrial Co., Ltd., product name: "SILKLON NES85", thickness=10 μm) serving as a base material layer (1). The resultant structural body was passed through a laminator (0.3 MPa, speed: 0.5 m/min) at room temperature once, and was then aged in an oven at 50° C. for 1 day. After that, the release liner was peeled off. Thus, as shown in Table 1, a double-sided pressure-sensitive adhesive tape (1) having a total thickness of 200 μm (configuration: pressure-sensitive adhesive layer (1)/base material layer (1)/pressure-sensitive adhesive layer (1)) was obtained.

Evaluation results are shown in Table 1.

Example 2

The side of the pressure-sensitive adhesive layer (2) obtained in Production Example 2 on which the release liner was not arranged was bonded to each of both surfaces of a polyester-based polyurethane resin film (manufactured by Okura Industrial Co., Ltd., product name: "SILKLON NES85", thickness=15 μm) serving as a base material layer (2). The resultant structural body was passed through a laminator (0.3 MPa, speed: 0.5 m/min) at room temperature once, and was then aged in an oven at 50° C. for 1 day. After that, the release liner was peeled off. Thus, as shown in Table 1, a double-sided pressure-sensitive adhesive tape (2) having a total thickness of 200 μm (configuration: pressure-sensitive adhesive layer (2)/base material layer (2)/pressure-sensitive adhesive layer (2)) was obtained.

Evaluation results are shown in Table 1.

Example 3

The side of the pressure-sensitive adhesive layer (3) obtained in Production Example 3 on which the release liner was not arranged was bonded to each of both surfaces of a polyester-based polyurethane resin film (manufactured by Okura Industrial Co., Ltd., product name: "SILKLON NES85", thickness=25 μm) serving as a base material layer (3). The resultant structural body was passed through a laminator (0.3 MPa, speed: 0.5 m/min) at room temperature once, and was then aged in an oven at 50° C. for 1 day. After that, the release liner was peeled off. Thus, as shown in Table 1, a double-sided pressure-sensitive adhesive tape (3) having a total thickness of 200 μm (configuration: pressure-sensitive adhesive layer (3)/base material layer (3)/pressure-sensitive adhesive layer (3)) was obtained.

Evaluation results are shown in Table 1.

Example 4

The side of the pressure-sensitive adhesive layer (4) obtained in Production Example 4 on which the release liner was not arranged was bonded to each of both surfaces of a polyester-based polyurethane resin film (manufactured by Okura Industrial Co., Ltd., product name: "SILKLON NES85", thickness=40 μm) serving as a base material layer (4). The resultant structural body was passed through a laminator (0.3 MPa, speed: 0.5 m/min) at room temperature once, and was then aged in an oven at 50° C. for 1 day. After that, the release liner was peeled off. Thus, as shown in Table 1, a double-sided pressure-sensitive adhesive tape (4) having a total thickness of 200 μm (configuration: pressure-sensitive adhesive layer (4)/base material layer (4)/pressure-sensitive adhesive layer (4)) was obtained.

Evaluation results are shown in Table 1.

Example 5

The side of the pressure-sensitive adhesive layer (5) obtained in Production Example 5 on which the release liner was not arranged was bonded to each of both surfaces of a polycarbonate-based polyurethane resin film (manufactured by Nihon Matai Co., Ltd., product name: "ESMER URS PX90", thickness=30 μm) serving as a base material layer (5). The resultant structural body was passed through a laminator (0.3 MPa, speed: 0.5 m/min) at room temperature once, and was then aged in an oven at 50° C. for 1 day. After that, the release liner was peeled off. Thus, as shown in Table 1, a double-sided pressure-sensitive adhesive tape (5) having a total thickness of 200 μm (configuration: pressure-sensitive adhesive layer (5)/base material layer (5)/pressure-sensitive adhesive layer (5)) was obtained.

Evaluation results are shown in Table 1.

Example 6

The side of the pressure-sensitive adhesive layer (5) obtained in Production Example 5 on which the release liner was not arranged was bonded to each of both surfaces of a polyether-based polyurethane resin film (manufactured by Nihon Matai Co., Ltd., product name: "ESMER URS ET-B", thickness=30 μm) serving as a base material layer (6). The resultant structural body was passed through a laminator (0.3 MPa, speed: 0.5 m/min) at room temperature once, and was then aged in an oven at 50° C. for 1 day. After that, the release liner was peeled off. Thus, as shown in Table 1, a double-sided pressure-sensitive adhesive tape (6) having a total thickness of 200 μm (configuration: pressure-sensitive adhesive layer (5)/base material layer (6)/pressure-sensitive adhesive layer (5)) was obtained.

Evaluation results are shown in Table 1.

Example 7

The side of the pressure-sensitive adhesive layer (6) obtained in Production Example 6 on which the release liner was not arranged was bonded to each of both surfaces of a polyester-based polyurethane resin film (manufactured by Okura Industrial Co., Ltd., product name: "SILKLON NES85", thickness=25 μm) serving as a base material layer (3). The resultant structural body was passed through a laminator (0.3 MPa, speed: 0.5 m/min) at room temperature once, and was then aged in an oven at 50° C. for 1 day. After that, the release liner was peeled off. Thus, as shown in Table 1, a double-sided pressure-sensitive adhesive tape (7) having a total thickness of 200 μm (configuration: pressure-sensitive adhesive layer (6)/base material layer (3)/pressure-sensitive adhesive layer (6)) was obtained.

Evaluation results are shown in Table 1.

Example 8

The side of the pressure-sensitive adhesive layer (7) obtained in Production Example 7 on which the release liner was not arranged was bonded to each of both surfaces of a polyester-based polyurethane resin film (manufactured by Okura Industrial Co., Ltd., product name: "SILKLON NES85", thickness=25 μm) serving as a base material layer (3). The resultant structural body was passed through a laminator (0.3 MPa, speed: 0.5 m/min) at room temperature once, and was then aged in an oven at 50° C. for 1 day. After that, the release liner was peeled off. Thus, as shown in Table 1, a double-sided pressure-sensitive adhesive tape (8) having a total thickness of 200 μm (configuration: pressure-sensitive adhesive layer (7)/base material layer (3)/pressure-sensitive adhesive layer (7)) was obtained.

Evaluation results are shown in Table 1.

Example 9

The side of the pressure-sensitive adhesive layer (8) obtained in Production Example 8 on which the release liner was not arranged was bonded to each of both surfaces of a polyester-based polyurethane resin film (manufactured by Okura Industrial Co., Ltd., product name: "SILKLON NES85", thickness=25 μm) serving as a base material layer (3). The resultant structural body was passed through a laminator (0.3 MPa, speed: 0.5 m/min) at room temperature once, and was then aged in an oven at 50° C. for 1 day. After that, the release liner was peeled off. Thus, as shown in Table 1, a double-sided pressure-sensitive adhesive tape (9) having a total thickness of 200 μm (configuration: pressure-sensitive adhesive layer (8)/base material layer (3)/pressure-sensitive adhesive layer (8)) was obtained.

Evaluation results are shown in Table 1.

Comparative Example 1

The two pressure-sensitive adhesive layer surfaces of the pressure-sensitive adhesive layers (9) obtained in Production Example 9 on which the release liners were not arranged were bonded to each other. The resultant structural body was passed through a laminator (0.3 MPa, speed: 0.5 m/min) at room temperature once, and was then aged in an oven at 50° C. for 1 day. After that, the release liners were peeled off. Thus, as shown in Table 1, a double-sided pressure-sensitive adhesive tape (C1) having a total thickness of 200 μm (configuration: pressure-sensitive adhesive layer (9)/pressure-sensitive adhesive layer (9)) was obtained.

Evaluation results are shown in Table 1.

Comparative Example 2

The side of the pressure-sensitive adhesive layer (10) obtained in Production Example 10 on which the release liner was not arranged was bonded to each of both surfaces of a polyester-based polyurethane resin film (manufactured by Okura Industrial Co., Ltd., product name: "SILKLON NES85", thickness=25 μm) serving as a base material layer (3). The resultant structural body was passed through a laminator (0.3 MPa, speed: 0.5 m/min) at room temperature once, and was then aged in an oven at 50° C. for 1 day. After that, the release liner was peeled off. Thus, as shown in Table 1, a double-sided pressure-sensitive adhesive tape (C2) having a total thickness of 200 μm (configuration: pressure-sensitive adhesive layer (10)/base material layer (3)/pressure-sensitive adhesive layer (10)) was obtained.

Evaluation results are shown in Table 1.

Comparative Example 3

The side of the pressure-sensitive adhesive layer (11) obtained in Production Example 11 on which the release liner was not arranged was bonded to each of both surfaces of a polyester-based polyurethane resin film (manufactured by Okura Industrial Co., Ltd., product name: "SILKLON NES85", thickness=25 μm) serving as a base material layer (3). The resultant structural body was passed through a laminator (0.3 MPa, speed: 0.5 m/min) at room temperature once, and was then aged in an oven at 50° C. for 1 day. After that, the release liner was peeled off. Thus, as shown in Table 1, a double-sided pressure-sensitive adhesive tape (C3) having a total thickness of 200 μm (configuration: pressure-sensitive adhesive layer (11)/base material layer (3)/pressure-sensitive adhesive layer (11)) was obtained.

Evaluation results are shown in Table 1.

Comparative Example 4

The side of the pressure-sensitive adhesive layer (12) obtained in Production Example 12 on which the release liner was not arranged was bonded to each of both surfaces of a polyester-based polyurethane resin film (manufactured by Okura Industrial Co., Ltd., product name: "SILKLON NES85", thickness=70 μm) serving as a base material layer (C4). The resultant structural body was passed through a laminator (0.3 MPa, speed: 0.5 m/min) at room temperature once, and was then aged in an oven at 50° C. for 1 day. After that, the release liner was peeled off. Thus, as shown in Table 1, a double-sided pressure-sensitive adhesive tape (C4) having a total thickness of 200 μm (configuration: pressure-sensitive adhesive layer (12)/base material layer (C4)/pressure-sensitive adhesive layer (12)) was obtained.

Evaluation results are shown in Table 1.

TABLE 1

| | | | Example 1 | Example 2 | Example 3 | Example 4 | Example 5 | Example 6 | Example 7 |
|---|---|---|---|---|---|---|---|---|---|
| Formulation | Monomer component (m) | Kind | BA/AA = 95:5 | BA/AA = 95:5 | BA/AA = 95:5 | BA/AA = 95:5 | BA/AA = 95:5 | BA/AA = 95:5 | BA/AA = 93:7 |
| | | Part(s) by weight | 100 | 100 | 100 | 100 | 100 | 100 | 100 |
| | Tackifying resin | Kind | YS POLYESTER T-115 | YS POLYESTER T-115 | YS POLYESTER T-115 | YS POLYESTER T-115 | YS POLYESTER T-115 | YS POLYESTER T-115 | YS POLYESTER T-115 |

TABLE 1-continued

|  |  |  | | | | | | | |
|---|---|---|---|---|---|---|---|---|---|
|  |  | Part(s) by weight | 20 | 20 | 20 | 20 | 20 | 20 | 20 |
|  | Cross-linking agent 1 | Kind | TETRAD-C | TETRAD-C | TETRAD-C | TETRAD-C | TETRAD-C | TETRAD-C | TETRAD-C |
|  |  | Part(s) by weight | 0.02 | 0.02 | 0.02 | 0.02 | 0.02 | 0.02 | 0.02 |
|  | Cross-linking agent 2 | Kind | CORONATE L | CORONATE L | CORONATE L | CORONATE L | CORONATE L | CORONATE L | CORONATE L |
|  |  | Part(s) by weight | 3 | 5 | 5 | 3 | 3 | 3 | 3 |
|  | Additive | Kind | AT-DN101 | AT-DN101 | AT-DN101 | AT-DN101 | AT-DN101 | AT-DN101 | AT-DN101 |
|  |  | Part(s) by weight | 6 | 6 | 6 | 6 | 6 | 6 | 6 |
| Force at 100% strain (N/m) | | | 32 | 48 | 80 | 128 | 121 | 57 | 32 |
| Kind of base material | | | Polyester-based polyurethane | Polyester-based polyurethane | Polyester-based polyurethane | Polyester-based polyurethane | Polycarbonate-based polyurethane | Polyether-based polyurethane | Polyester-based polyurethane |
| Thickness of base material (μm) | | | 10 | 15 | 25 | 40 | 30 | 30 | 25 |
| Ratio of thickness of base material layer to total thickness | | | 5% | 8% | 13% | 20% | 15% | 15% | 13% |
| Total thickness (μm) | | | 200 | 200 | 200 | 200 | 200 | 200 | 200 |
| Impact resistance (J) | | | 0.59 | 0.59 | 0.51 | 0.44 | 0.34 | 0.39 | 0.44 |
| Alcohol resistance | | | 5 | 5 | 5 | 5 | 5 | 5 | 4 |
| Reworkability | | | 3 | 3 | 5 | 5 | 4 | 4 | 5 |

|  |  |  | Example 8 | Example 9 | Comparative Example 1 | Comparative Example 2 | Comparative Example 3 | Comparative Example 4 |
|---|---|---|---|---|---|---|---|---|
| Formulation | Monomer component (m) | Kind | BA/AA = 97:3 | BA/AA/4HBA = 93:7:0.05 | BA/AA = 95:5 | 2EHA/AA = 90:10 | BA/AA = 95:5 | BA/AA = 95:5 |
|  |  | Part(s) by weight | 100 | 100 | 100 | 100 | 100 | 100 |
|  | Tackifying resin | Kind | YS POLYSTER T-115 | YS POLYSTER T-115 | YS POLYSTER T-115 | YS POLYSTER T-115 | YS POLYSTER T-115 | YS POLYSTER T-115 |
|  |  | Part(s) by weight | 20 | 20 | 20 | 20 | 20 | 20 |
|  | Cross-linking agent 1 | Kind | TETRAD-C | TETRAD-C | TETRAD-C | TETRAD-C | TETRAD-C | TETRAD-C |
|  |  | Part(s) by weight | 0.02 | 0.02 | 0.02 | 0.02 | 0.02 | 0.02 |
|  | Cross-linking agent 2 | Kind | CORONATE L | CORONATE L | CORONATE L | CORONATE L | CORONATE L | CORONATE L |
|  |  | Part(s) by weight | 3 | 2 | 3 | 3 | 3 | 3 |
|  | Additive | Kind | AT-DN101 | AT-DN101 | AT-DN101 | AT-DN101 | AT-DN101 | AT-DN101 |
|  |  | Part(s) by weight | 6 | 6 | 6 | 6 | 6 | 6 |
| Force at 100% strain (N/m) | | | 80 | 80 | 14 | 80 | 75 | 224 |
| Kind of base material | | | Polyester-based polyurethane | Polyester-based polyurethane | None | Polyester-based polyurethane | Polyester-based polyurethane | Polyester-based polyurethane |
| Thickness of base material (μm) | | | 25 | 25 | 0 | 25 | 25 | 70 |
| Ratio of thickness of base material layer to total thickness | | | 13% | 13% | 0% | 13% | 50% | 35% |
| Total thickness (μm) | | | 200 | 200 | 200 | 200 | 50 | 200 |
| Impact resistance (J) | | | 0.44 | 0.39 | 0.44 | 0.29 | 0.07 | 0.22 |
| Alcohol resistance | | | 4 | 4 | 4 | 1 | 5 | 4 |
| Reworkability | | | 3 | 5 | 1 | 2 | 2 | 5 |

The double-sided pressure-sensitive adhesive tape according to at least one embodiment of the present invention can be suitably used for the inside of a mobile device or the like. The double-sided pressure-sensitive adhesive tape according to at least one embodiment of the present invention is typically used for fixing an electronic device member.

According to at least one embodiment of the present invention, the double-sided pressure-sensitive adhesive tape that can express all of excellent impact resistance, excellent reworkability, and excellent alcohol resistance can be provided.

What is claimed is:
1. A double-sided pressure-sensitive adhesive tape, comprising:
   a base material layer formed of an unfoamed resin film containing a polyurethane-based resin as a main component; and
   pressure-sensitive adhesive layers arranged on both surface sides of the base material layer,
   wherein the pressure-sensitive adhesive layers are each formed from a pressure-sensitive adhesive composition,
   wherein the pressure-sensitive adhesive composition contains at least one kind selected from the group consisting of a monomer component (m) and a polymer component (P) obtained by polymerizing the monomer component (m),
   wherein the monomer component (m) contains 50 wt % or more of butyl (meth)acrylate,
   wherein a ratio of a thickness of the base material layer to a total thickness of the double-sided pressure-sensitive adhesive tape is less than 35%, and wherein the double-sided pressure-sensitive adhesive tape has a force, which is generated at 100% strain at 23° C. and 50% RH, of from 30 N/m to 150 N/m.

2. The double-sided pressure-sensitive adhesive tape according to claim 1, wherein the monomer component (m) contains 90 wt % to 99 wt % of the butyl (meth)acrylate.

3. The double-sided pressure-sensitive adhesive tape according to claim 1, wherein the monomer component (m) contains 1 wt % to 10 wt % of (meth)acrylic acid.

4. The double-sided pressure-sensitive adhesive tape according to claim 1, wherein the double-sided pressure-sensitive adhesive tape has a total thickness of 100 μm or more.

5. The double-sided pressure-sensitive adhesive tape according to claim 1, wherein the double-sided pressure-sensitive adhesive tape is used for fixing an electronic device member.

\* \* \* \* \*